US010628934B2

(12) United States Patent
Weaver

(10) Patent No.: US 10,628,934 B2
(45) Date of Patent: Apr. 21, 2020

(54) PRINTER DEVICE, PRINTER MARKING SYSTEM AND METHOD WITH MULTI-STAGE PRODUCTION PRINT INSPECTION

(71) Applicant: Videojet Technologies Inc., Wood Dale, IL (US)

(72) Inventor: Robert Weaver, Sandy Springs, VA (US)

(73) Assignee: VIDEOJET TECHNOLOGIES INC, Wood Dale, IL (US)

( * ) Notice: Subject to any disclaimer, the term of this patent is extended or adjusted under 35 U.S.C. 154(b) by 0 days.

(21) Appl. No.: 16/324,410

(22) PCT Filed: Aug. 11, 2017

(86) PCT No.: PCT/US2017/046507
§ 371 (c)(1),
(2) Date: Feb. 8, 2019

(87) PCT Pub. No.: WO2018/031890
PCT Pub. Date: Feb. 15, 2018

(65) Prior Publication Data
US 2019/0220971 A1    Jul. 18, 2019

Related U.S. Application Data

(60) Provisional application No. 62/373,540, filed on Aug. 11, 2016.

(51) Int. Cl.
*G06T 7/00* (2017.01)
*H01H 9/30* (2006.01)
(Continued)

(52) U.S. Cl.
CPC .......... *G06T 7/0004* (2013.01); *B41J 29/393* (2013.01); *G06K 9/3241* (2013.01);
(Continued)

(58) Field of Classification Search
CPC ......... B41J 29/393; B41J 29/38; G06K 9/325; G06K 9/3233; G06K 2209/27;
(Continued)

(56) References Cited

U.S. PATENT DOCUMENTS 4,006,332 A    2/1977   Crookston et al.
5,212,741 A    5/1993   Barski et al.
(Continued)

OTHER PUBLICATIONS

PCT/US2017/046507 International Search Report and Written Opinion, dated Sep. 1, 2017, 11 pages.
(Continued)

*Primary Examiner* — Jannelle M Lebron
(74) *Attorney, Agent, or Firm* — Beusse, Wolter, Sanks & Maire PLLC; Robert L. Wolter

(57) ABSTRACT

A device comprising a printer configured to apply a code of printed content on a substrate of a product based on a printer technology type, the code having a plurality of digits. The device includes an optical code detector, executed by one or more processors, to detect the code in a received image of the product printed by the printer by optically recognizing characters in the received image using a trained optical character recognition (OCR) algorithm for the printer technology type. The OCR algorithm is trained to identify each digit of the plurality of digits of the code in a region of interest (ROI) based on at least one product parameter to which the printed content is directly applied and the printer technology type. A system and method are also provided.

20 Claims, 16 Drawing Sheets

(51) Int. Cl.
*B41J 29/393* (2006.01)
*G06K 9/32* (2006.01)
*G06K 9/62* (2006.01)

(52) U.S. Cl.
CPC ............ *G06K 9/6262* (2013.01); *H01H 9/30* (2013.01); *G06K 2209/01* (2013.01); *G06K 2209/27* (2013.01); *G06T 2207/30144* (2013.01)

(58) Field of Classification Search
CPC ............... G06K 9/3241; G06K 9/6262; G06K 2209/01; G06T 2207/30176; G06T 2207/30144; G06T 7/0004; G06T 2207/30; H01H 9/30
See application file for complete search history.

(56) References Cited

U.S. PATENT DOCUMENTS

| 2006/0075241 | A1 | 4/2006 | Deguillaume |
| 2007/0080085 | A1 | 4/2007 | Lawlor |
| 2014/0363081 | A1* | 12/2014 | Bell ........................ G06K 9/54 |
| | | | 382/182 |
| 2016/0019439 | A1 | 1/2016 | Wang et al. |
| 2018/0096231 | A1* | 4/2018 | Bhat .................. G06K 9/00463 |

OTHER PUBLICATIONS

PCT/US2017/046507 International Preliminary Report on Patentability, dated Feb. 12, 2019, 9 pages.
PCT/US2017/046507 International Search Report and Written Opinion, dated Apr. 12, 2019, 7 pages.

* cited by examiner

PRINTER DEVICE, PRINTER MARKING SYSTEM AND METHOD WITH MULTI-STAGE PRODUCTION PRINT INSPECTION

CROSS-REFERENCE TO RELATED APPLICATION

This application claims benefit of U.S. Provisional Application No. 62/373,540, filed Aug. 11, 2016, the entire contents of which is hereby incorporated by reference as if fully set forth herein, under 35 U.S.C. § 119(e).

BACKGROUND

The embodiments relate to a printer device, printer marking system and method with multi-stage production print inspection.

Optical character recognition for continuous inkjet (CIJ) in industrial application is difficult. Currently, the camera system embedded with vision systems have 50% reliability in the inspection performance for industrial applications. Many customers are skeptical about the accuracy of vision systems because these systems fail, usually due to high rates of false positives. A false positive is when the vision system rates a good product as bad product. Rating products as bad has consequences. The first consequence is wasting time to visually inspect the product manually which can be costly if a high number of products must be visually inspected. A second consequence is turning the vision system off so the production can run.

Smart cameras with vision systems are very costly in comparison to cameras without a vision system. For example, a smart camera could cost $3500 while a camera without a vision system may cost $500. In industrial applications, the cost increases with multiple production lines with multiple different printer technology.

SUMMARY

Embodiments herein relate to a printer device, printer marking system and method with multi-stage production print inspection. Embodiments may also include non-transitory, tangible computer-readable storage medium.

An aspect of the embodiments includes a device comprising a printer configured to apply a code of printed content on a substrate of a product based on a printer technology type, the code having a plurality of digits. The device includes an optical code detector, executed by one or more processors, to detect the code in a received image of the product printed by the printer by optically recognizing characters in the received image using a trained optical character recognition (OCR) algorithm for the printer technology type. The OCR algorithm is trained to identify each digit of the plurality of digits of the code in a region of interest (ROI) based on at least one parameter of the product to which the printed content is directly applied and the printer technology type.

Another aspect of the embodiments includes a system, comprising: a printer configured to apply a code of printed content on a substrate of a product based on a printer technology type, the code having a plurality of digits. The system includes a camera to capture automatically an image of the code on the substrate of the product. The system includes an optical code detector, executed by one or more processors, to detect the code in the captured image of the product printed by the printer by optically recognizing characters in the captured image using a trained optical character recognition (OCR) algorithm for the printer technology type. The OCR algorithm is trained to identify each digit of the plurality of digits of the code in a region of interest (ROI) based on at least one parameter of the product to which the printed content is directly applied and the printer technology type.

Another aspect of the embodiments includes a method, comprising: printing, by a printer, a code of printed content on a substrate of a product based on a printer technology type, the code having a plurality of digits; automatically capturing, by a camera, an image of the code on the substrate of the product; and optically detecting, by one or more processors, the code in the captured image of the product printed by the printer, the detecting includes optically recognizing characters in the captured image using a trained optical character recognition (OCR) algorithm for the printer technology type, the OCR algorithm trained to identify each digit of the plurality of digits of the code in a region of interest (ROI) based on at least one parameter of the product to which the printed content is directly applied and the printer technology type.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which.

DETAILED DESCRIPTION

Figure 1A:
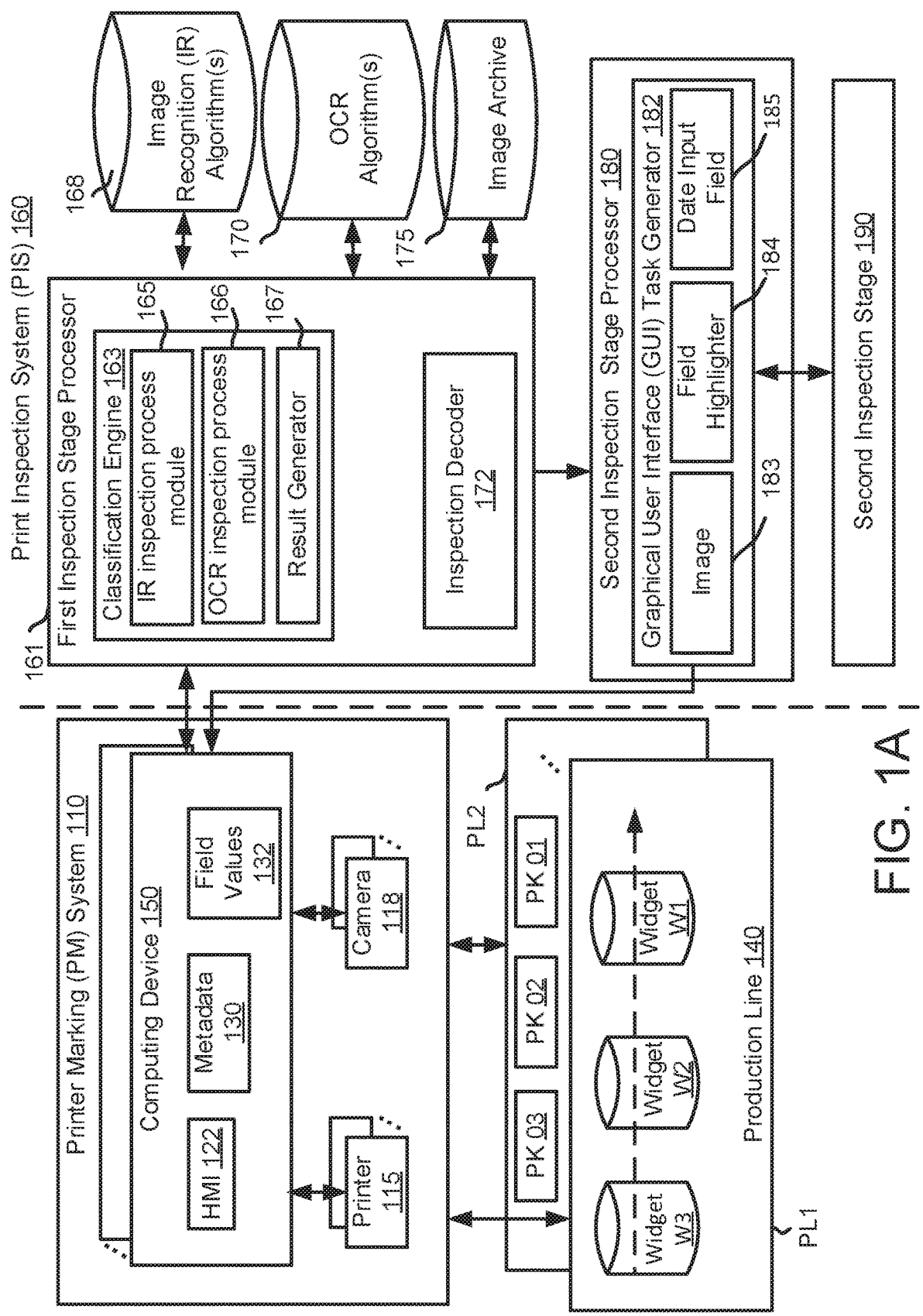
FIG. 1A illustrates a block diagram of a print marking (PM) system with multi-stage production print inspection.

Embodiments are described herein with reference to the attached figures wherein like reference numerals are used throughout the figures to designate similar or equivalent elements. The figures are not drawn to scale and they are provided merely to illustrate aspects disclosed herein. Several disclosed aspects are described below with reference to non-limiting example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Figure 10:
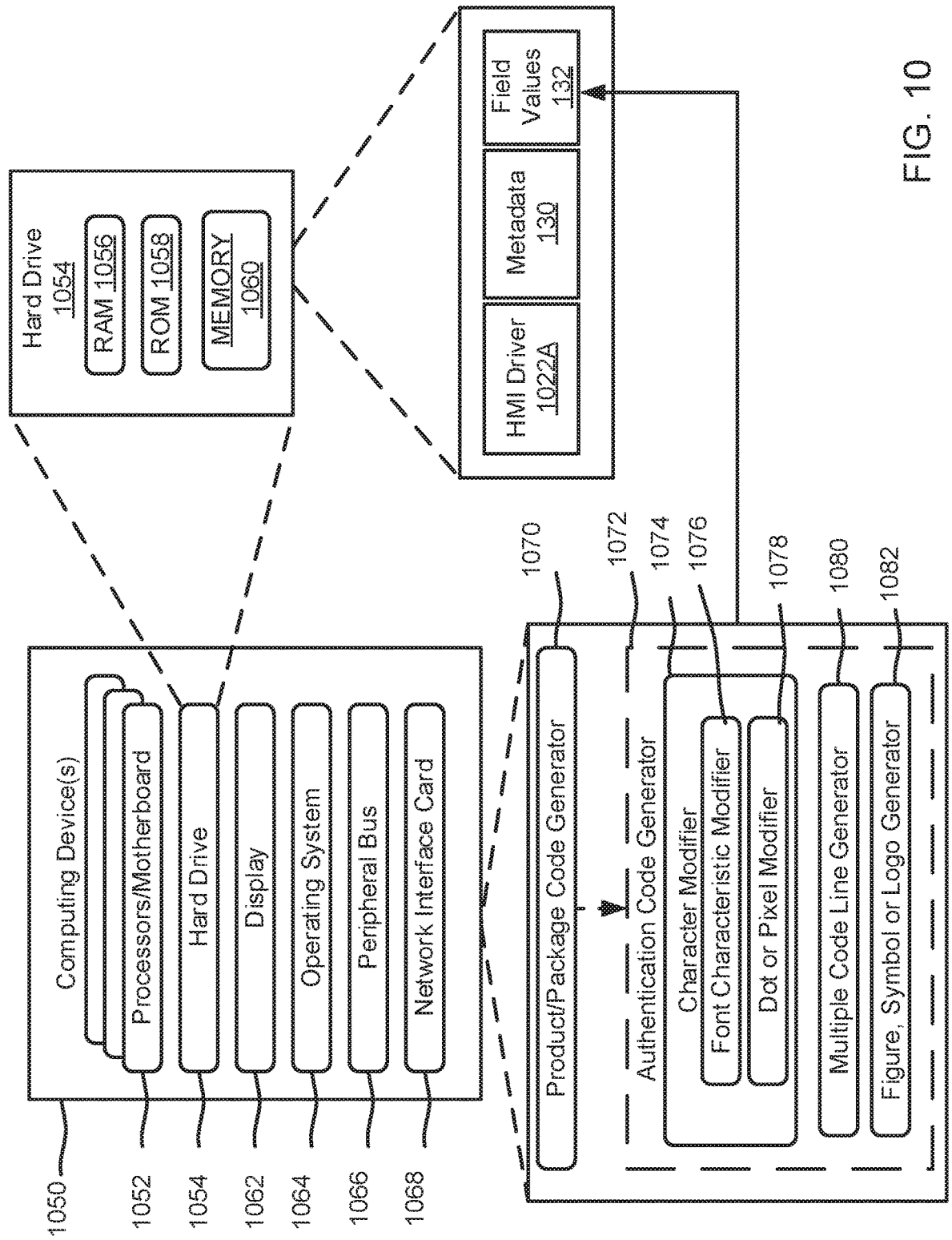
FIG. 10 illustrates a block diagram of a computing device.

FIG. 1A illustrates a print marking (PM) system 110 with multi-stage production print inspection. The PM system 110 may comprises at least one printer 115 and at least one camera 118 interfaced with at least one computing device 150. Each computing device 150 may have at least one human machine interface (HMI) 122 and metadata 130 stored in a memory (FIG. 10). The at least one computing device 150 may each store field values 132. The at least one computing device 150 will be described in more detail in relation to FIG. 10. By way of non-limiting example, the at least one printer 115 may include one or more of continuous inkjet (CIJ) printer, laser printer, thermal transfer overprinting (TTO) printer, thermal inkjet (TIJ) printer and LCM printer.

The PM system 110 may be interfaced with a print inspection system (PIS) 160. The print inspection system 160 may include a first inspection stage processor 161 and a second inspection stage processor 180. The at least one HMI 122 may display information received from the first inspection stage processor 161 and a second inspection stage processor 180. In some embodiments, there may be a single HMI 122 per computing device 150. The at least one camera 118 may be associated with the PM system 110 or may be part of the PIS 160 system. The at least one camera 118 being part of the PIS 160 would be an embedded component in the PM system 110. In some embodiments, the at least one camera 118 may be shared with one or more systems.

The printer 115 may be paired with an optical character recognition (OCR) algorithm executed by at least one processor to form an optical code detector. The optical code detector, executed by one or more processors, detect the code in a received image of the product printed by the printer 115 by optically recognizing characters in the received image using a trained optical character recognition (OCR) algorithm for the printer technology type. By way of non-limiting example, the OCR algorithm may be trained to identify each digit of the plurality of digits of the code in a selected region of interest (ROI) based on printer parameters such as without limitation, a substrate type corresponding to a material of the substrate and a curvature of the substrate to which the printed content is directly applied and the printer technology type.

For the sake of brevity, the PM system 110 is shown with a production line 140. The production line 140 may serially move a plurality of widgets W1, W2 and W3 shown. The dashed arrow represents the direction of flow of the production line 140. During production, the widgets are printed with content (i.e., printed content) or code. The production line 140 may include parallel paths PL1 and PL2. The path PL1 may move the widgets W1, W2 and W3 to a printer in path PL1 for printing in a designated region of interest (ROI). The path PL2 may move packages (PK), by way of non-limiting example, configured for widgets W1, W2 and W3 to a printer in path PL2 for printing in a designated region of interest (ROI). Each path PL1 and PL2 may include at least one camera and at least one printer. The metadata and field vale for each path PL1 and PL2 may be synchronized and/or correlated to the metadata and field values of the other parallel path.

Nonetheless, some widgets may not include separate packaging. Furthermore, some widgets may have additional regions of interest (ROI) which are to be printed, each ROI may have use a different printer technology to print the characters and/or symbols of the printed content and may use a different path in the production line 140.

The production line 140 may include at least one printer 115 to print printed content in at least one region of interest on a widget or package.

In an embodiment, the at least one HMI 122 may include a display 1062 (FIG. 10) and HMI driver 1022A (FIG. 10) configured to display printer information from and to the printer 115 and camera information from and to camera 118. The display 1062 may be a touchscreen. The printer 115 may be controlled by printer metadata and print drivers. The print drivers may be specific to the printer manufacture or may have customized features and settings. The metadata 130 may include printer settings for the printed text to be printed by the printer 115. The production line 140 is controlled by production line metadata. The camera 118 may be operated based on control data (such as camera setting and triggers) and/or metadata. The camera 118 may be configured to capture an image of a widget W1, W2 or W3 having a printer marking applied or printed by printer 115. In some instances, the widget W1, W2 and W3 are to be packaged in package (PK) 01, 02 and 03, respectively. Thus, the codes printed on packages PK 01, 02 and 03 may be synchronized with the codes or field values of widgets W1, W2 and W3, for example.

The widget comprises a manufactured product. The manufactured product may include a widget substrate to or upon which a printed code is printed via a printer 115. The widget substrate may be a container filled with a product material. In such instance, the printing is on the widget substrate and not the product material, especially, if the product material is dispensed from the container, such as for consumption or application.

The camera 118 may capture images at a rate R wherein the rate R may be a system setting to initiate the triggering of the image capture process by the camera 118. In some embodiments, the camera 118 may capture images every one minute, two minutes or other intervals. For a production cycle, the rate R may vary. By way of non-limiting example, in some embodiments, the rate may be slower at the beginning of a production cycle and faster at an end of the production cycle. In other embodiments, the rate R may be a constant rate. The rate of image capture may be a function of the rate at which the production line moves.

The captured image is a source of information to the computing device 150. The computing device 150 communicates the captured image with metadata and field values to the first inspection stage processor 161 to start the inspection process. The computing device 150 provides field values 132 to the printer 115 to perform the printing and to the first inspection stage processor 161 for use in the inspection process.

The computing device 150 identifies field values 132 for a batch of widgets or a single widget being processed by the production line 140. Field values 132 may be the character content of printed text or code. In some embodiments, the field values 132 or product/package codes are provided by a customer. In some embodiments, the field values 132 include a product or package code automatically generated by the product or package code generator 1070 (FIG. 10). The product or package code may be a standard code using standard character, numerical or symbols in any language. The standard character, numerical or symbol in any language may be printed in a manner consistent with industry and/or industrial standards or practices for any one particular printer technology for the application of printed content on a substrate. In some embodiments, the production line will generate an authentication code based on the standard product/package code(s), as will be discussed in more detail in relation to FIGS. 10 and 15A-15B. A batch of widgets may include two or more widgets.

Figure 3:
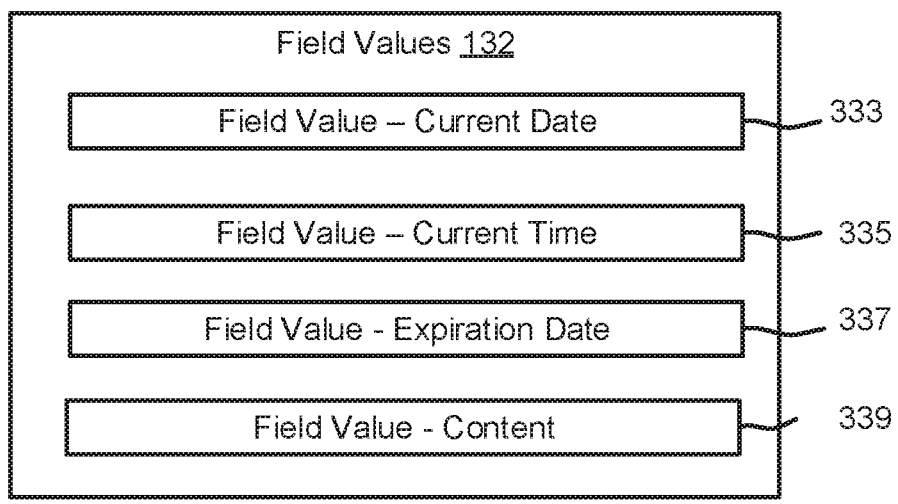
FIG. 3 illustrates a block diagram of a field values.

FIG. 3 illustrates a block diagram of field values 132. For instance, the field values 132 may include one or more values which denote a current date 333, current time 335, an expiration date 337, or a best by date. The field values may vary and are not limited to those specifically referenced by example. The field values 132 may include field value content 339 such as symbols, logo, or text (i.e., alphanumeric characters). The values of the field values 132 may include alphanumeric character streams or symbols which are capable of being printed or made by a printer. The field value 132 may include information representative of a logo. The alphanumeric character stream, symbols, text or logo may hereinafter be referred to as "printed content."

The field values 132 provide the basis of comparison to determine whether the printer 115 is printing accurate information (i.e., the printed content). By way of non-limiting example, image recognition (IR) algorithms in database 168 may be used to reduce an area within the captured image to an area of the printed content, the printed content is compared against the field value 132 to determine correctness or accuracy. By way of non-limiting example, in the case where the image is inspected by a man-in-the-loop process, the human may use the field values 132 provided by way of a graphic user interface (GUI) to determine correctness or accuracy. The man-in-the-loop process will be described in detail later. This stage of inspection may be used to train the OCR algorithms as the man-in-the-loop may find false positives and/or false failures. The OCR algorithms may be updated to address the results of the second stage inspection process.

The inspection system 160 may include an optical character algorithm(s) database 170 coupled to the first inspection stage processor 161. The inspection system 160 may include an image archive database 175 also coupled to the first inspection stage processor 161. The term database may represent one or more memory devices or tangible and non-transitory computer readable storage devices.

Figure 2:
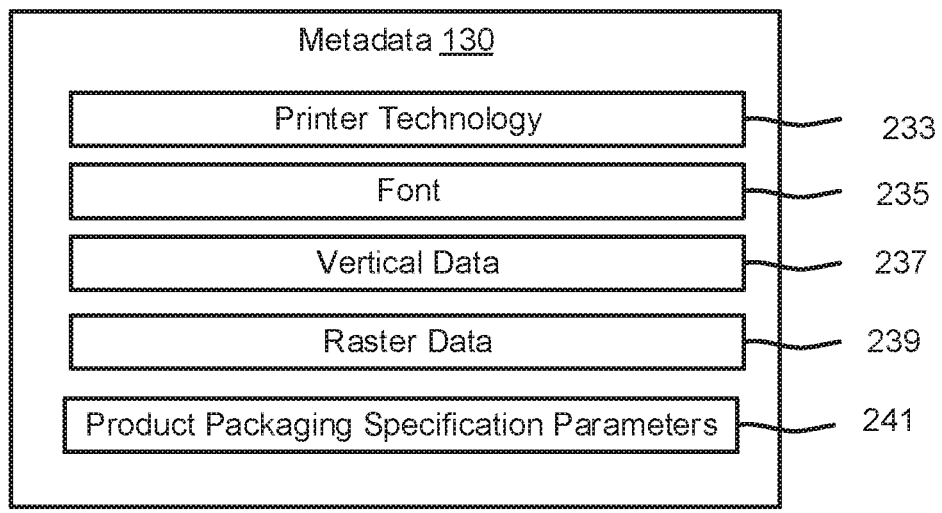
FIG. 2 illustrates a block diagram of a metadata.

FIG. 2 illustrates a block diagram of metadata 130. Metadata 130 may include parameters which include the print technology or type 233 used to print on the widgets in the production line 140. The metadata 130 may include one or more of font data 235, raster data 239, vertical data 237 and other data. Font data 235 and raster data 239 may be used to decipher the image into characters, by an optical character recognition inspection process module 166, as will be described later. The metadata may vary and are not limited to the parameters or data specifically referenced by example.

Metadata 130 may include product packaging specification parameters 241 and data that can classify the product profile to select an image recognition (IR) algorithm in database 168 from a plurality of image recognition algorithms. Printer technology may include the type of printer such as continuous inkjet (CIJ), laser, thermal transfer overprinting (TTO), thermal inkjet (TIJ) and LCM used in the specific marking process. The product packaging specification parameters may include details of the widget such as without limitation, color, material and surface curvature. Surface curvature may include an indicator which identifies whether the surface is convex or concave surface. Material types may include plastic material, reflective material, non-reflective material, glossy material, transparent material, etc.

The inventor has determined that recognition of images on at least a bottle closure and a curved surface have a higher rate of false positives on such bottle closures or curved surfaces. The classification engine 163 may perform an image recognition on a received image to determine first whether the product type is the correct product type. Printed characters on a curved surface, may have a perspective view as compared to printed characters printed on a non-curved surface.

Figure 4:
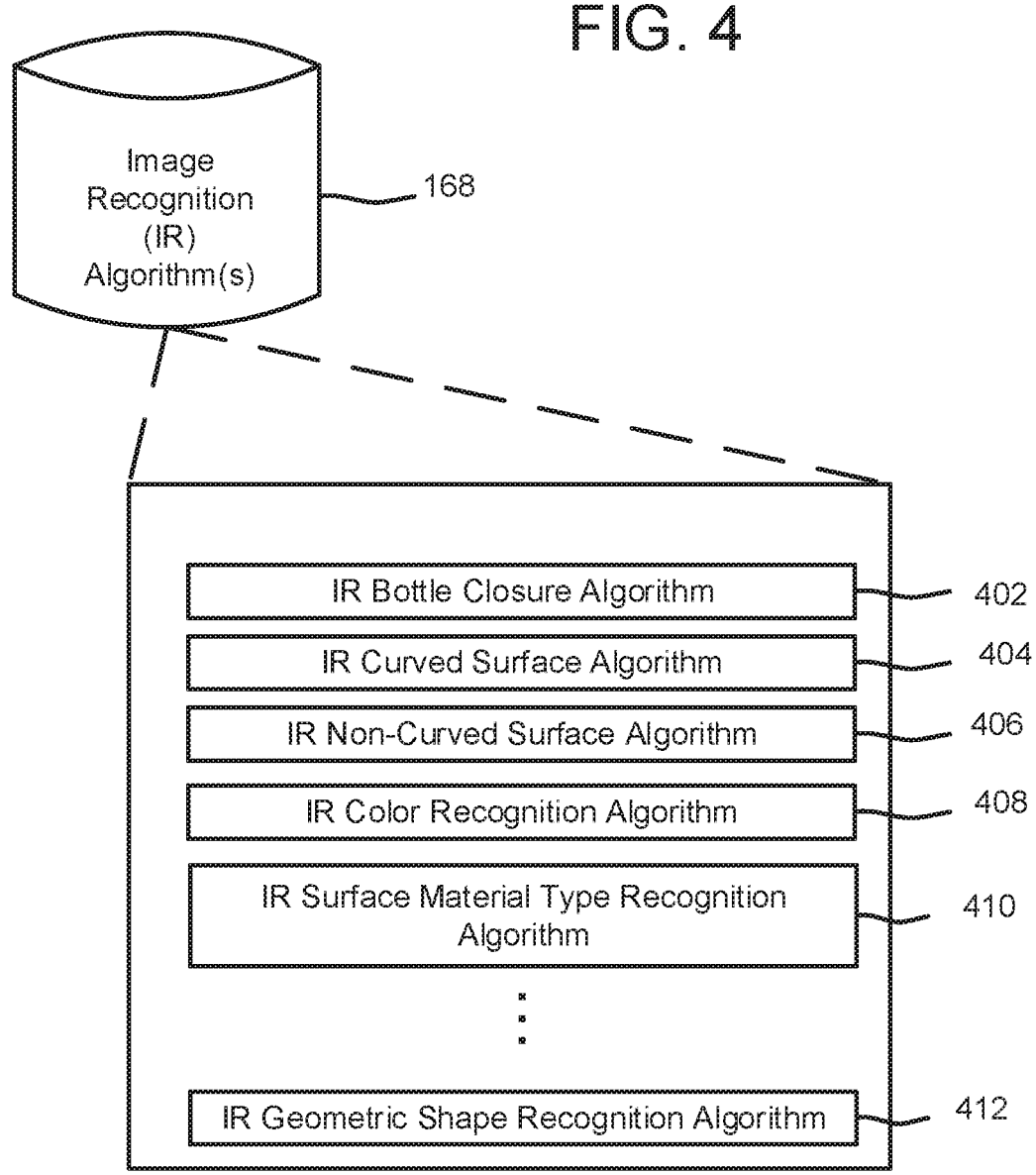
FIG. 4 illustrates a block diagram of a database of image recognition (IR) algorithms.

FIG. 4 illustrates a block diagram of a database 168 of a plurality of image recognition (IR) algorithms. The database 168 may include one or more of an IR bottle closure algorithm 402, an IR curved surface algorithm 404, an IR non-curved surface algorithm 406, an IR color recognition algorithm 408, an IR surface material type recognition algorithm 410 and an IR geometrical shape recognition algorithm 412. The database 168 may include a plurality of IR algorithms which can differentiate a geometrical shape of product(s).

The classification engine 163 of the first inspection stage processor 161 performs two inspection procedures. The first inspection procedure may use a selected image recognition algorithm to validate the product (i.e., widget) correlated to the metadata in an IR inspection process module 165. The IR inspection process module 165 may use one or more algorithms to verify or validate multiple product profile parameters. For example, a customer may want different product profiles to be processed differently than other product profiles.

The IR inspection process module 165 may provide an inspection process to validate that the product (i.e., widget) being inspected is a match to the correct product with the correct product parameters. The IR inspection process module 165 may also allow validation of a color of the product. Nonetheless, the metadata may include product parameters which may include one or more of size, shape, color, type, design, substrate type, substrate material, reflectivity of substrate, concavity of substrate, convexity of substrate, transparency of substrate, etc. being unique to the product's physical classifiable profile. The IR inspection process module 165 may be improved or optimized such that the processing time of the image is reduced by tailoring the IR algorithm based on the metadata.

By way of non-limiting example, the printed content may be designated for a "red" colored widget with a curved surface having a concave surface. The first inspection procedure may determine whether the image received classifies the product according to the product's physical classifiable profile. In other words, the IR inspection process module 165 may specifically look for a curved surface profile or some other geometrical shape. Hence, the metadata is provided to the first inspection stage processor 161 so that an image recognition algorithm is selected specifically for a geometrical profile by the IR inspection process module 165. In other examples, the image recognition algorithm may be configured to recognize a bottle closure. In other examples, the image recognition algorithm may be configured to recognize a non-curved surface. In some embodiments, if the product's physical classifiable profile is not validated, a response is sent to the computing device 150. Thus, the production line 140 may be halted or an alert generated to the appropriate production monitor or quality control monitor. The alert may include an email alert, text message alert, light indicator or speaker output. For example, the production monitor may determine that the wrong product is on the production line 140. In another example, a certain color product may require a white ink while another color product may require a black ink.

The product may include multiple areas with different colors. Certain colors may be used to designate a printed content area. Thus, in some embodiments, the printed content area may be detected by the IR inspection process module 165. For example, in some embodiments, the printed content is applied to an area with barcodes where the area has a geometrical shape such as a square or rectangle and may be white in color. Thus, OCR inspection process module 166 may use information from module 165 and the metadata to perform OCR in the designated white area to start the inspection process 166, for example. In some embodiments, multiple areas in the image have printed content wherein each area is inspected by an OCR algorithm. In some embodiments, the entire image is subjected to an OCR algorithm.

The first inspection stage processor 161 may perform optical character recognition (OCR) inspection process module 166 to produce an OCR content result to the result generator 167. In some embodiment, the OCR inspection process module 165 may detect printed content in the printed content area if provided by the IR inspection process module 165. In some embodiments, the OCR inspection process module 166 may use metadata to determine the area within the image to start the OCR inspection process module 166. The OCR content result for each optically recognized character and/or logo is sent to the result generator 167 and assembled so that the resultant character stream generated by the OCR inspection process module 166 may be decoded to validate the printed content of the resultant character stream. If the printed content is decoded and validated, the first inspection stage processor 161 provides a response to the computing device 150 to indicate that the inspection passed or validated. The first inspection stage processor 161 may include an inspection decoder 172 to decode the OCR content result to validate the printed content.

Figure 5A:
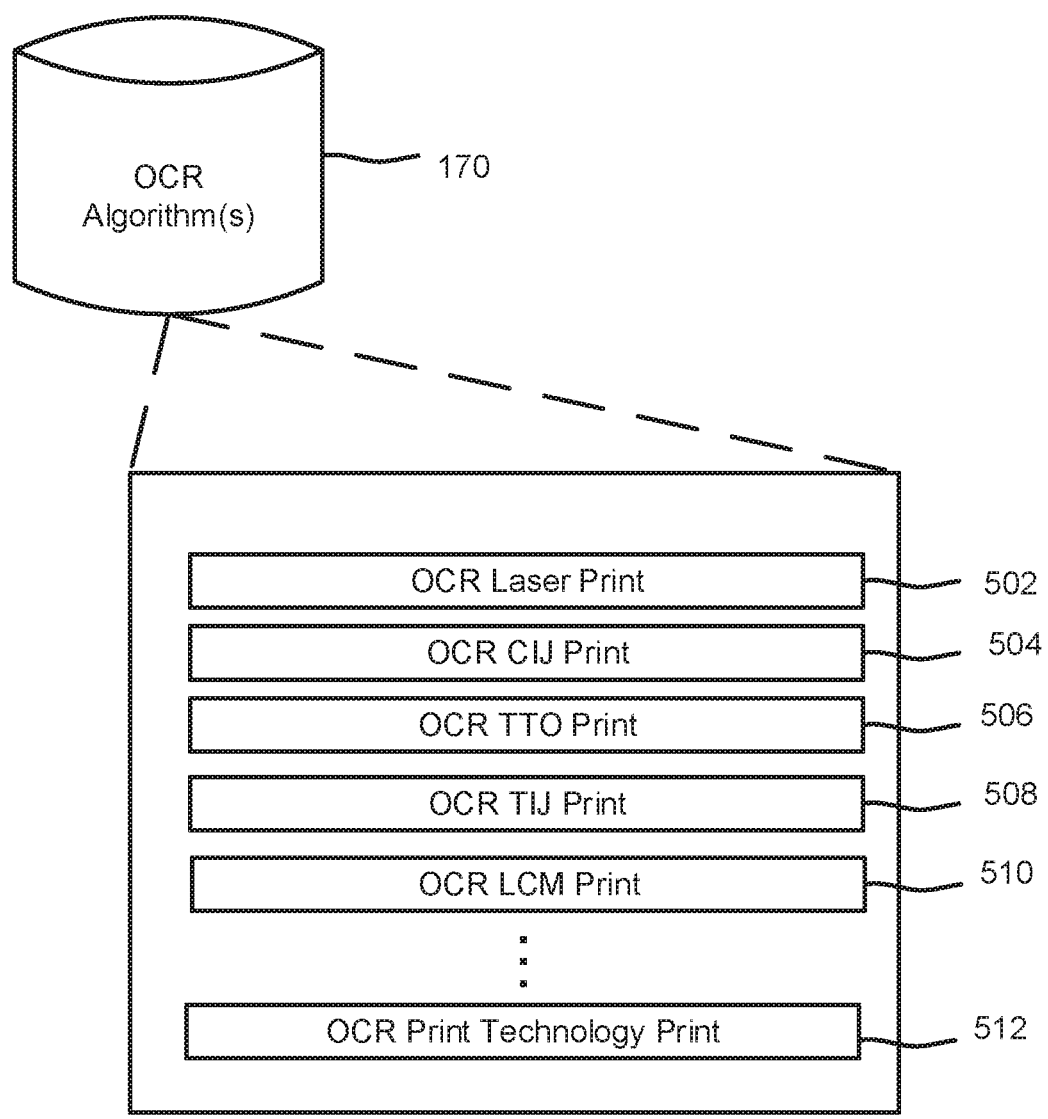
FIG. 5A illustrates a block diagram of a database of optical character recognition (OCR) algorithms.

FIG. 5A illustrates a block diagram of a database 170 of a plurality of optical character recognition (OCR) algorithms. The plurality of optical character recognition (OCR) algorithms may include an OCR laser print algorithm 502, OCR CIJ print algorithm 504, OCR TTO print algorithm 506, OCR TIJ print algorithm 508, OCR LCM inkjet print algorithm 510, or other OCR print technology print algorithm 512. An LCM inkjet prints large characters. The optical character recognition (OCR) inspection process module 166 may be improved or optimized such that the processing time of the OCR is reduced by tailoring the OCR algorithm to the print technology.

Figure 5B:
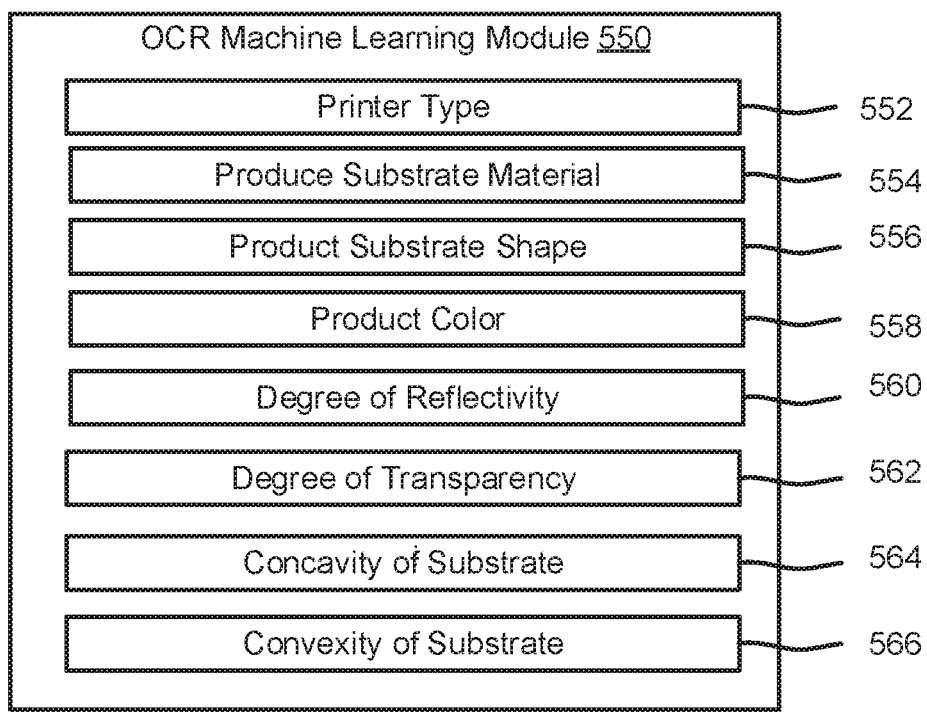
FIG. 5B illustrates a block diagram of a OCR machine learning module.

FIG. 5B illustrates a block diagram of a OCR machine learning module 550. Each OCR algorithm may include an OCR machine learning module 550 configured to be trained to improve print inspection performance and, if appropriate, authentication codes for a counterfeit detection system. The OCR machine learning module 550 may be configured and trained for a printer technology type 552. The OCR machine learning module 550 may be trained based on one or more product parameters. The product parameters may include material, shape, concavity of the product or substrate, reflectivity of the material or product, the transparency of the material or product, and the color of the product or material. The training may be based on the color of material or type of material (i.e., solid, powder, liquid) stored within a transparent container where the transparent container provides the substrate on which a printed code is applied. Collectively, the container and material within the container may be sometimes referred to as a product. For example, the OCR machine learning module 550 may be trained based on a product substrate material 554. The OCR machine learning module 550 may be trained based on product substrate shape 556. The OCR machine learning module 550 may be trained based on product color 558. The OCR machine learning module 550 may be trained based on degree of reflectivity 560. The OCR machine learning module 550 may be trained based on degree of transparency 562. The OCR machine learning module 550 may be trained based on concavity of substrate 564. The OCR machine learning module 550 may be trained based on convexity of substrate 566. The results from the second inspection stage can update the OCR machine learning module 550 with the results of the second inspection stage, as appropriate, to improve performance. The OCR machine learning module 550 may be trained based on at least one digit of a code regardless of whether the at least one digit passed or failed optical recognition detection.

By way of non-limiting example, characters, numbers and/or symbols printed on a reflective substrate may not, in some instances, be properly recognized.

By way of non-limiting example, characters and symbols printed on a transparent substrate may be difficult to recognize based on the product filled in the transparent container. This can be more problematic if the printed characters or symbols include a first character portion which resides in filled portion of the container while a second character portion resides in an un-filled portion of the transparent container. Furthermore, the color of the product filled in a transparent container may diminish the recognition of the characters. Thus, the second inspection stage can update the OCR machine learning module 550 to train the OCR machine learning module 550 such as, by way of non-limiting example, through supervised learning. The OCR machine learning module 550 may be trained in some instances based on unsupervised learning.

The machine learning module may employ neural networks, artificial neural networks, Bayesian networks, learning classifier systems, decision tree learning, etc.

Figure 6:
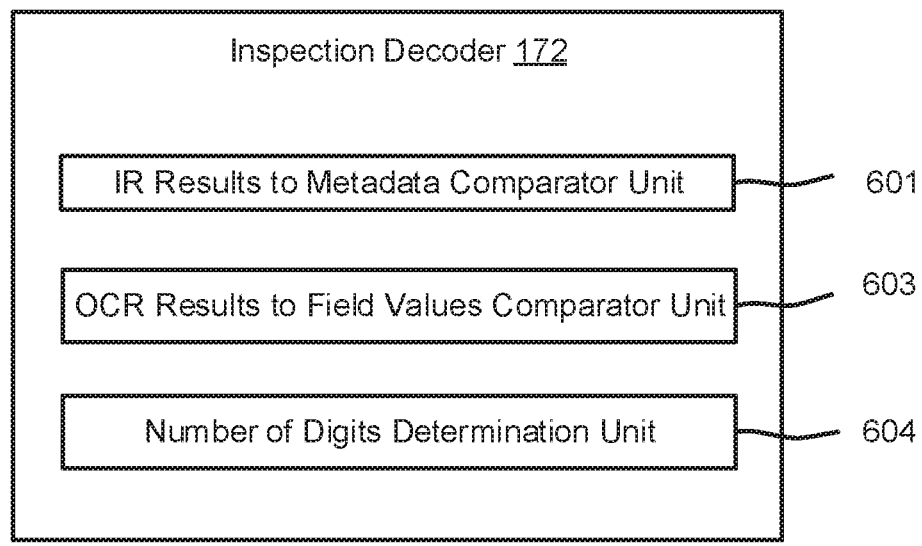
FIG. 6 illustrates a block diagram of an inspection decoder.

FIG. 6 illustrates a block diagram of an inspection decoder 172. The inspection decoder 172 may include an IR results to metadata comparator unit 601 to compare the IR result, from the IR inspection process module 165, with one or more parameters of the metadata 130. The inspection decoder 172 may include an OCR results to field values comparator unit 603 and a number of characters determination unit 604. The printed content is validated when the OCR content result is the same based on the field value. The inspection decoder 172 may determine the number of characters or digits in the OCR content which could be validated by the number of characters determination unit 604.

The first inspection stage processor 161 may determine an error in the OCR inspection process module 166 such that the process was aborted or whether no characters could be recognized.

The processor 161 or inspection decoder 172 may determine that decoding failed by at least one of units 601 or 603. If decoding failed, a communication is generated for receipt by the second inspection stage processor 180. The second inspection processor 180 includes a graphical user interface (GUI) task generator 182 which produces a GUI for the second inspection stage 190. The GUI task generator 182 obtains the image 183 for population of the GUI wherein the image was used in the IR inspection process module 165. In one example, the GUI task generator 182 may generate a data input field 185 to allow a man-in-the-loop in the second inspection stage 190 to enter the visually inspected characters of the text in the image 183 for comparison with the field value 132. In some embodiments, the image 183 is overlaid with at least one highlighted box entered by the field highlighter 184 which surrounds an inspection region with the printed content. The GUI may include multiple highlighted boxes. The second inspection stage 190 may include a man-in-the-loop process where humans perform visual inspection. For example, the GUI may include a task request having an application programming interface (API) for Mechanical Turk by Amazon®. In another embodiment, the man-in-the-loop may include an in-house inspection team or other quality assurance (QA) service provider. The results may train the OCR algorithms.

The GUI from generator 182 may prompt the user to identify whether the content in the highlighted box matches the expected image/characters. Once the answers are submitted by the GUI interface, the second inspection processor 180 communicates a result to the computing device 150. In one example, the result may be a pass or fail result.

The results from the first inspection stage processor 161 or the second inspection stage processor 180 may cause the marking system 110 to take action on the production line 140, such as stopping the production line or sending an alert or notification. A notification may include an email, text message, instant messaging alerts, etc.

Figure 7:
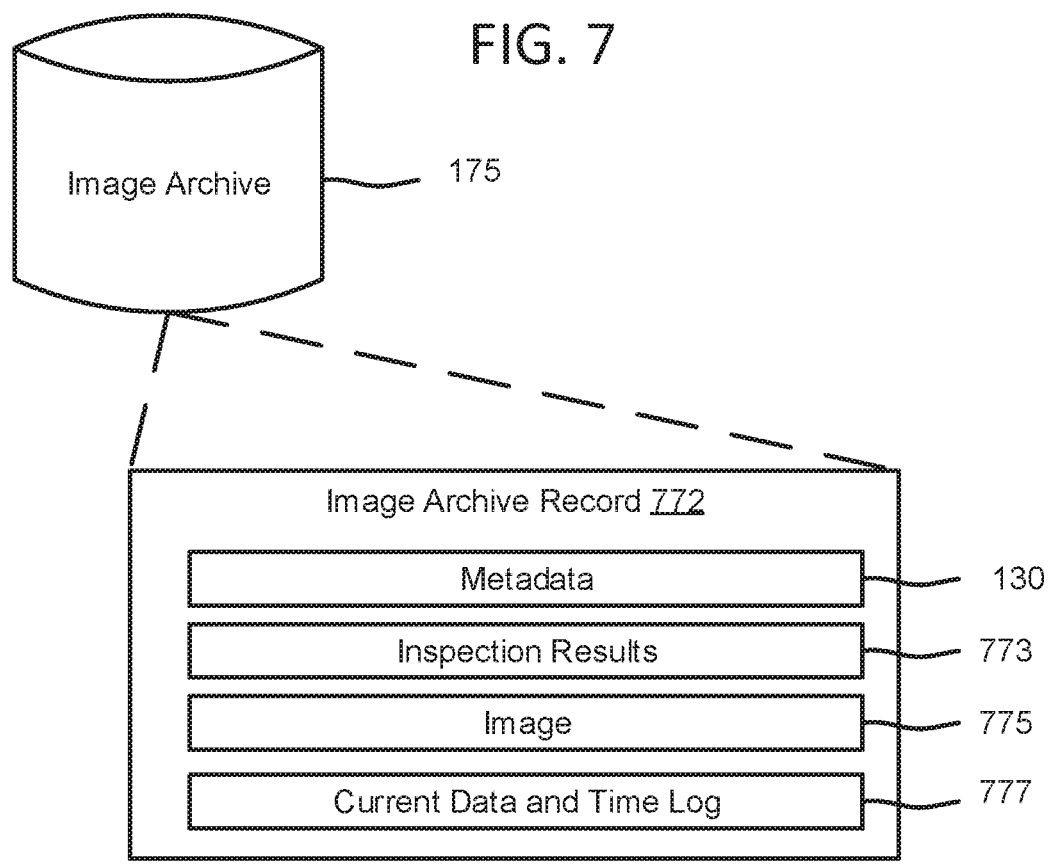
FIG. 7 illustrates a block diagram of a database of archived images.

FIG. 7 illustrates a block diagram of a database 175 of archived images stored in an image archive record 772. The computing device 150 or the first inspection stage processor 161 may store the received image in database 175. An image archive record may be developed. The image archive record 772 may include storing an image 775 with current date and time log information 777. The image may be stored with inspection results 773 such as without limitation pass or fail. The image 775 may be stored with metadata 130.

The repository of images that could not be decoded by may trigger a change in the production line 140 or require further evaluation. The archived image may be used by a customer's quality control (QC) department to be able to pull an historical image from the actual production line on a certain date/time.

The system may be used for an anti-counterfeit technique. In a system where images are used for an anti-counterfeit technique, the camera 118 would take at least one image of every printed or marked widget. The print content may act like a fingerprint for the product. However, the first inspection stage processor 161 may only process every X image for inspection of the print content for quality control purposes. In other words, in some embodiments, the printed content of every widget may not be inspected.

Figure 8A:
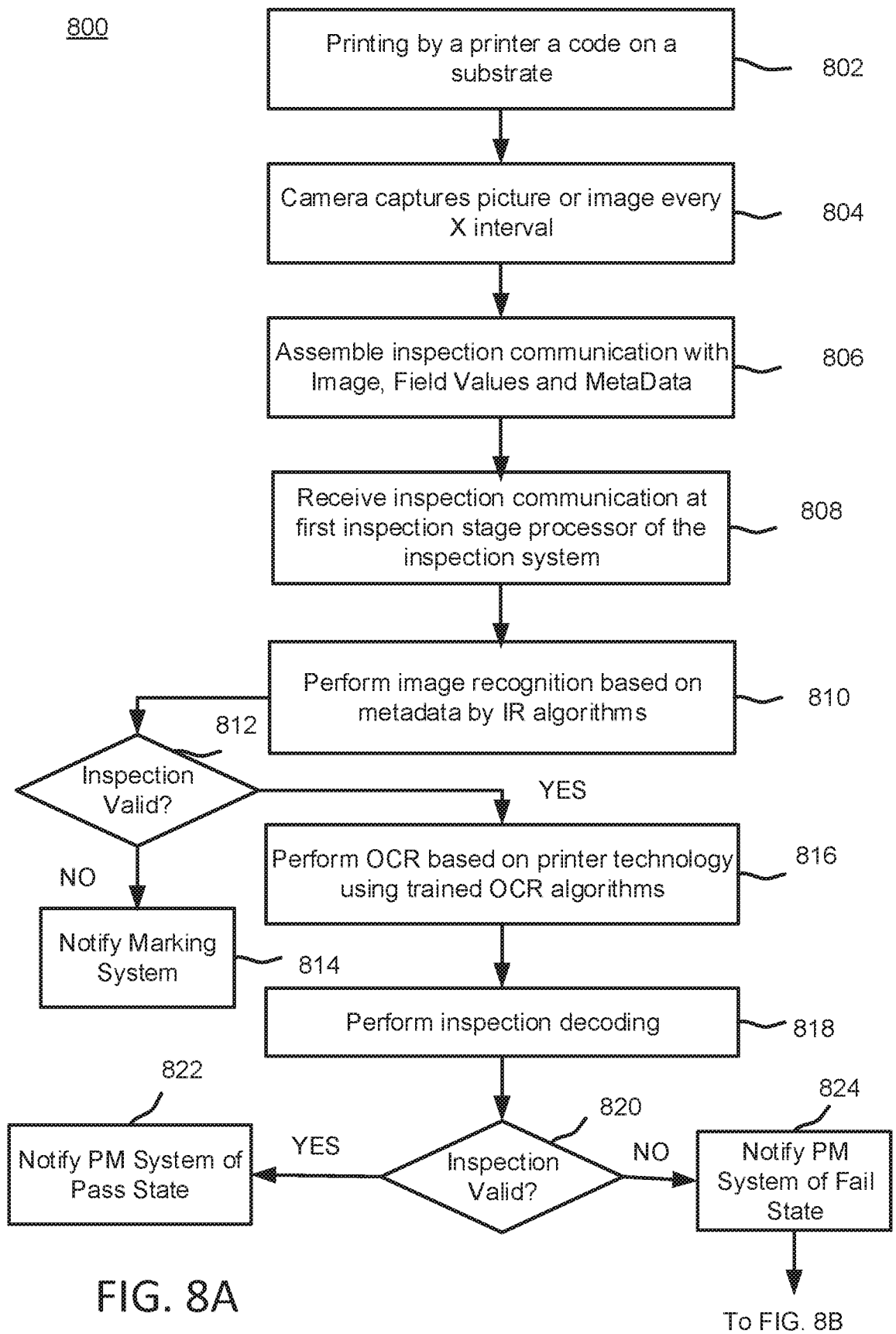
FIG. 8A-8B illustrate a flowchart of a method for print marking with a multi-stage inspection.
Figure 8B:
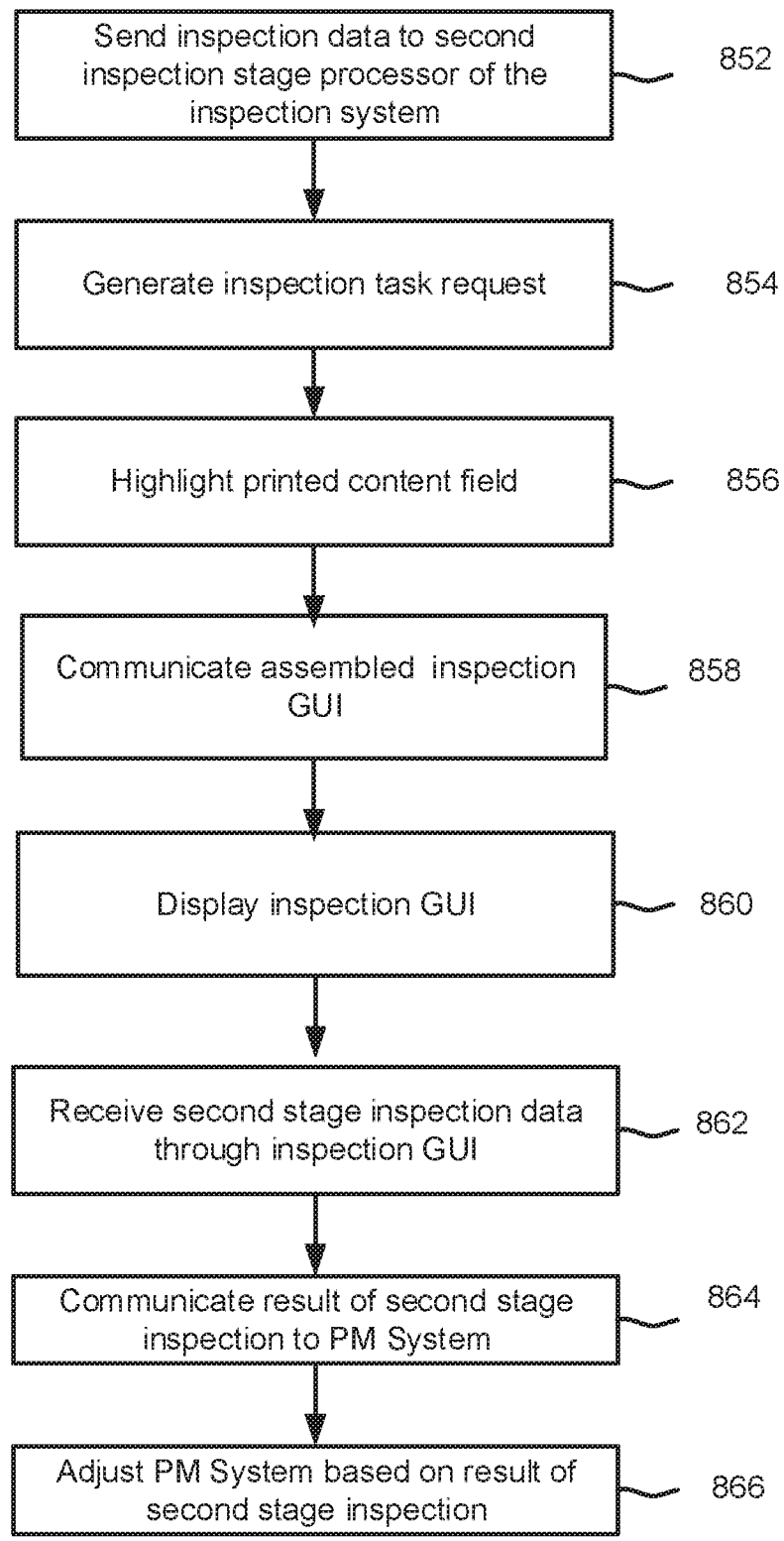

FIG. 8A-8B illustrate a flowchart of a method 800 for print marking with a multi-stage inspection. The method may perform the blocks in the order shown or in a different order. Additional blocks may be added or some blocks deleted. One or more of the blocks may be performed contemporaneously. The method 800 begins with block 802 and will be described in relation to FIG. 1A. As the widgets W1, W2 and W3 serially move through the printer 115, the widget W1, W2 and W3 is printed with printer text in the form of a code based on the metadata and field values for the production batch, at block 802.

At block 804, the camera 118 captures an image of the production line 140 at a predetermined rate R. In some embodiments, the rate may allow the camera 118 to capture one widget at a time or may skip widget. In some embodiments, the operation of the production line 140 movement, printing by printer 115 and image capturing by camera 118 may be synchronized or timed appropriately.

At block 806, an inspection communication is assembled by the computing device 150. The inspection communication may include the captured image. The inspection communication may include the field values 132 used in the print process and the metadata 130. The inspection communication is sent to the first inspection stage processor 161 where it is received at block 808.

At block 810, the first inspection stage processor 161 will process the received communication to perform an image recognition inspection process module 165 to determine a product classifiable profile. Metadata 130 may include product packaging specification parameters and values that can classify the image recognition algorithm in database 168 that will be used in process module 165. Thus, the first inspection stage processor 161 would look-up the image recognition algorithm in database 168 for optimizing the IR inspection process module 165. The image is then processed to recognize the physical profile of the widget. The classification engine 163 may perform an IR inspection process module 165 on a received image to determine first whether the physical profile is detected based on the product packaging specification parameters.

At block 812, if an error is generated, the product's physical classifiable profile was not detected, then an error message may be sent to the computer device 150 at block 814. The first inspection procedure may use an IR algorithm to validate the product (i.e., widget) correlated to the metadata. The production line 140 may be halted 140 or an alert generated to the appropriate production monitor or quality control monitor. The alert may include an email alert, text message alert, light indicator or speaker output. At block 812, if the physical profile is detected, the method 800 may continue to block 816.

At block 816, the classification engine 163 may perform an optical character recognition (OCR) algorithm from database 170. At block 222, the classification engine 163 will look-up the best OCR algorithm for the printer technology in the metadata. The classification engine 163 may look-up the best OCR algorithm based on the product packaging specification parameters as well. Block 816 will produce the OCR content result of the OCR algorithm. At block 818, the OCR content result may be decoded to validate the printed content.

At block 820, a determination is made whether the printed content is decoded and validated. If the determination is YES, the first inspection stage processor 161 provides a response to the computing device 150 to indicate that the inspection passed at block 822.

If the determination is NO, the inspection decoder 172 may have to also determine the number of characters in the OCR text which could be validated. A message of validation/inspection failed is sent to the computing device 150. The inspection decoder 172 may determine an error in the OCR process such that the process was aborted or whether no characters could be recognized. The inspection decoder 172 may produce a result which indicates decoding failed.

If the determination is NO, meaning decoding failed in some instances, a communication is generated for receipt by the second inspection stage processor 180. For example, there decoding may have decoded most characters. Thus, the second inspection stage processor 180 may be initiated only after a certain number of characters have failed decoding. The decoding thresholds may be set by the customer and/or for maintenance of the printer.

Turning now to FIG. 8B, at block 852, the inspection data is sent to the second inspection processor 180. At block 854, an inspection task request is generated which populates a graphic user interface (GUI) with image inspection parameters. At block 856, the printed content field is highlighted in the GUI. At block 858, the assembled GUI is communicated such as without limitation to a man-in-the-loop. At block 860, the inspection GUI is displayed. The man-in-the-loop will display the GUI and enter the information based on the instructions.

In some embodiments, the image is overlaid with at least one highlighted box which surrounds the inspection region. The GUI may prompt the user to identify whether the text/content in the highlighted box matches the expected image/characters. In another embodiment, a field may be provided in the GUI to enter the observed text. Once the answers are submitted, the second inspection processor 180 receives the answers through the interface with the GUI, at block 862. The interface may be a web-based internet or intranet interface. The interface may be an application programming interface (API).

At block 864, the second inspection processor 180 communicates a result to the computing device 150. In one example, the result may be a pass or fail result.

At block 866, the results from first inspection stage processor 161 or the second inspection stage processor 180 may cause the marking system 110 to take action on the production line, such as stopping the production line or sending an alert such as, by way of non-limiting example, for maintenance of the printer.

Figure 1B:
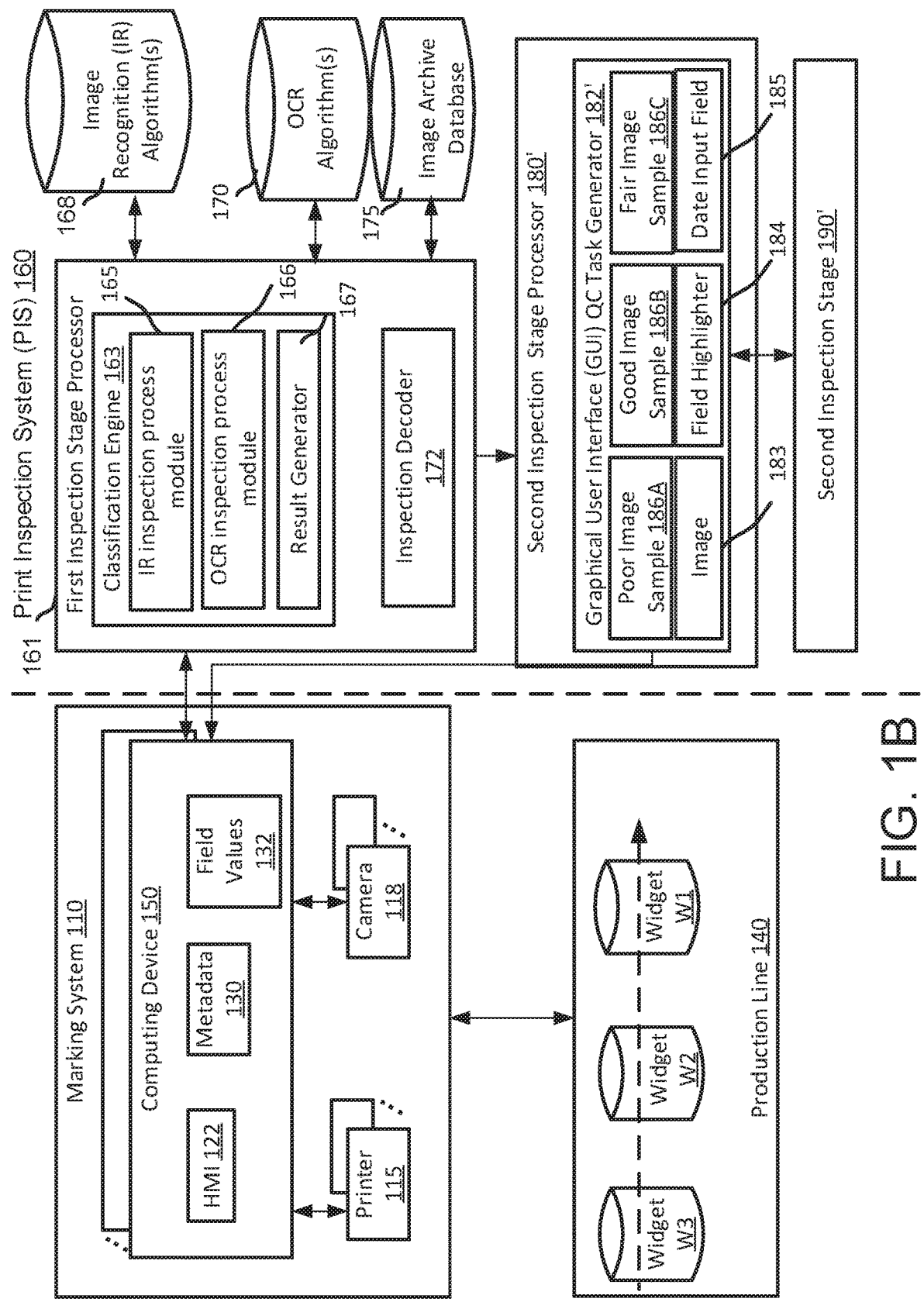
FIG. 1B illustrates a block diagram of print marking (PM) system with multi-stage production print inspection with a quality check.

FIG. 1B illustrates a block diagram of print marking (PM) system with multi-stage production print inspection with a quality check. The system in FIG. 1A is similar to FIG. 1B thus only the differences will be described for the sake of brevity. The multi-stage production print inspection incorporates a quality check. For example, the printer content may be decoded but the quality of the print may be poor. By way of non-limiting example, the ink may need to be replaced when the quality of the print deteriorates to a certain level.

The processor 161 or inspection decoder 172 may determine that decoding failed by at least one of units 601 or 603. If decoding failed, a communication is generated for receipt by the second inspection stage processor 180'. The second inspection processor 180' includes a graphical user interface (GUI) task generator 182 which produces a GUI for the second inspection stage 190'. The GUI task generator 182' obtains the image 183 for population of the GUI wherein the image was used in the IR inspection process module 165. In one example, the GUI task generator 182 may generate a data input field 185 to allow a man-in-the-loop in the second inspection state 190 to enter the visually inspected characters of the text in the image 183 for comparison with the field value 132. In some embodiments, the image 183 is overlaid with at least one highlighted box entered by the field highlighter 184 which surrounds an inspection region with the printed content. The GUI may include multiple highlighted boxes.

The GUI from generator 182' may prompt the user to identify whether the content in the highlighted box matches the expected image/characters. Once the answers are submitted by the GUI interface, the second inspection processor 180' communicates a result to the computing device 150. In one example, the result may be a pass or fail result.

Additionally, the GUI task generator 182 may retrieve a plurality of varying print quality images. The plurality of varying print quality images may include a poor image sample 186A, a good image sample 186B and a fair image sample 186C where the sample includes printed content having a certain print quality. The second inspection stage 190' may provide feedback regarding print quality flaws so the marking system 110 may dynamically adjust parameters to mitigate the print quality flaws. In some embodiments, the samples may be retrieved from the archived images in database 175.

In the print quality process, the operation of the inspection decoder 172 may change. For example, even if all characters are decoded, every X image decoded may be sent for a print quality check by the second inspection stage processor 180 and second inspection stage 190 where X is a number greater than 1. For example, a system may check every $10^{th}$ image or every $50^{th}$ image for print quality flaws and/or training OCR algorithms. However, once printed content starts to exhibit at least one character which cannot be recognized, the quality check interval may be decreased for example from 5 to 3 until the printed content fails validation.

Figure 9:
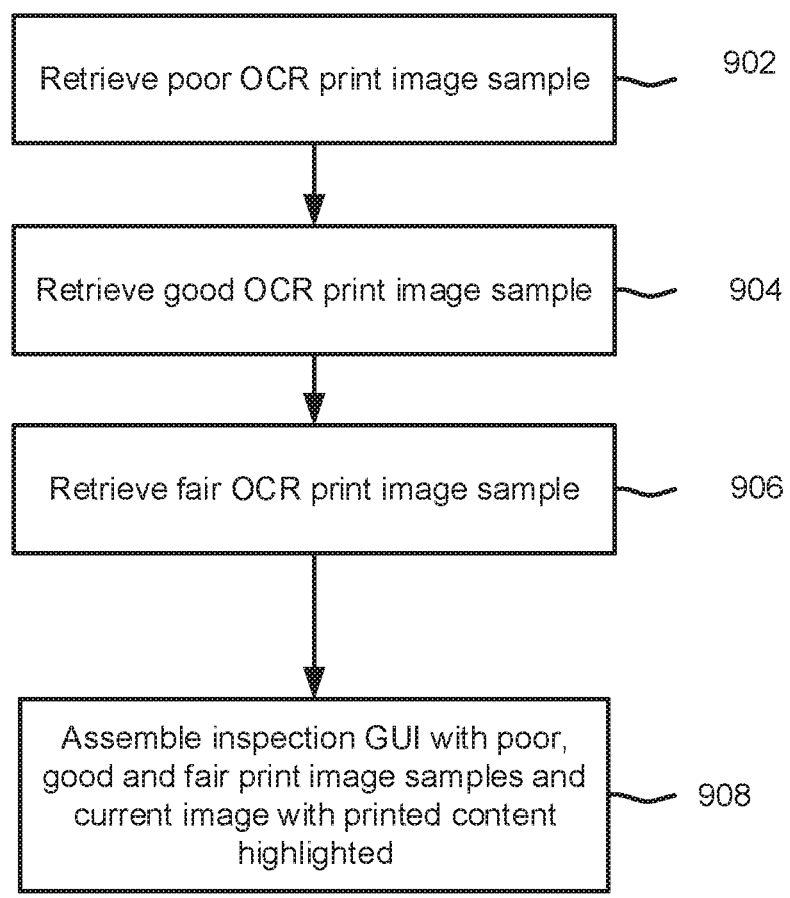
FIG. 9 illustrates a block diagram of a method to assemble an inspection graphical user interface (GUI) for a print quality check.

FIG. 9 illustrates a block diagram of a method 958 to assemble an inspection graphical user interface (GUI) for a print quality check using the system of FIG. 1B. The method 958 begins with retrieving a poor OCR print image sample at block 902. At block 904, a good OCR print image sample is retrieved. At block 906, a fair OCR print image sample is retrieved. At block 908, the GUI is assembled with the poor, good and fair samples and the current image with the text section or printed content section highlighted. Examples of images are generated of different classifications (i.e., poor, good, fair) and embedded in the GUI. For example, GUI will provide a field for selecting whether the current image is good, bad or fair based on a comparison to the embedded comparison images. In an embodiment, the comparison images may be specific to the print technology so that the same sample printed font types are used for comparison with the current image's printed content.

As a result of the print quality flaws, the system may need to replace the printer. In some embodiments, the ink may need to be replaced.

Figure 11:
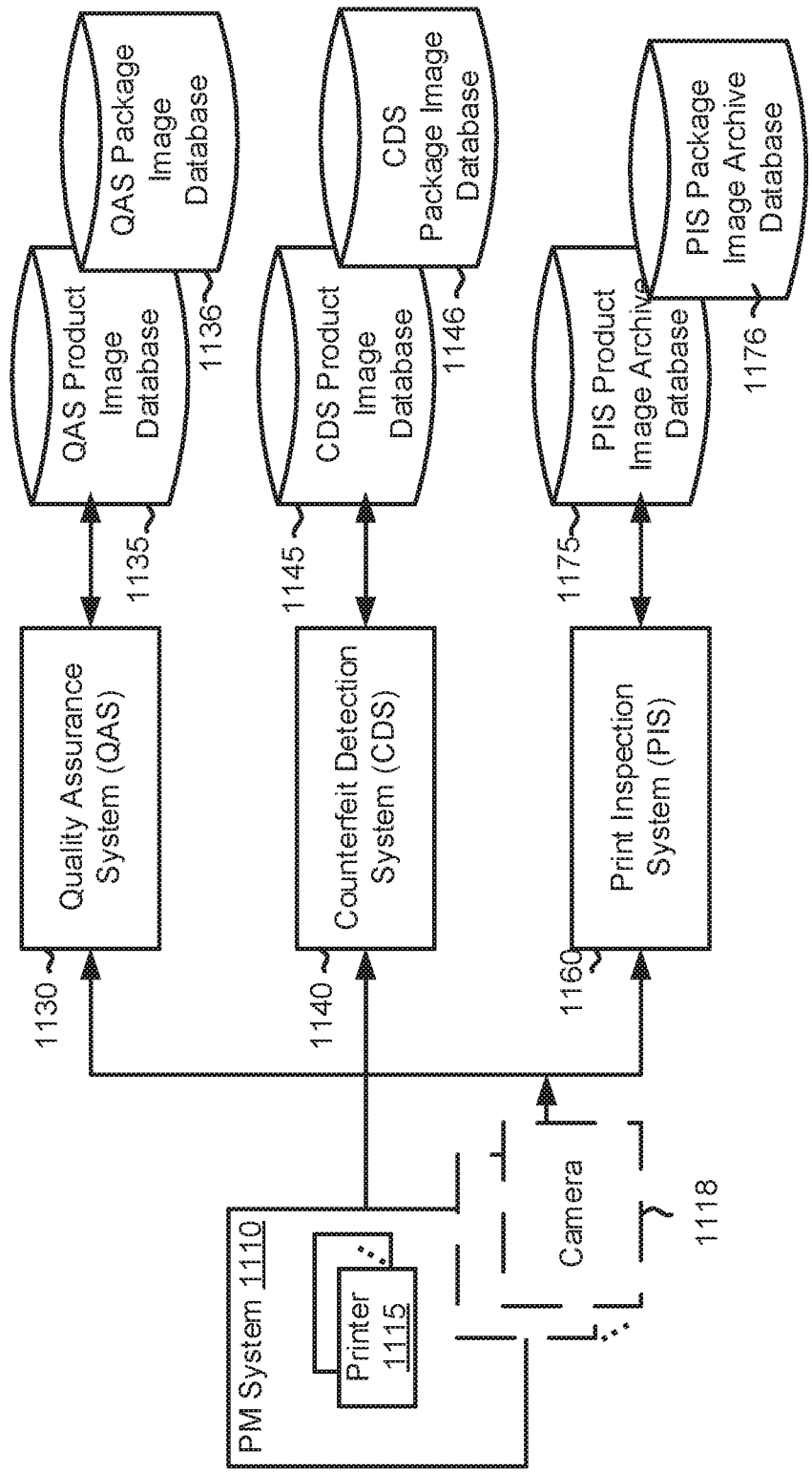
FIG. 11 illustrates a block diagram of a printer marking system interfaced with a plurality of systems.

FIG. 11 illustrates a block diagram of a printer marking (PM) system 1110 (i.e., PM system 110) interfaced with a plurality of systems 1130, 1140 and 1150. The system 1130 may be a quality assurance system (QAS). System 1140 may be a counterfeit detection system (CDS). System 1160 may be a print inspection system (PIS) (i.e., print inspection system 160). The PM system 1110 may include at least one printer 1115. In some embodiments, the PM system 110 may include at least one camera 1118. The PM system 1110 is similar to PM system 110 previously described. The images captured by the at least one camera 1118 may be sent to one or more of the QAS, the CDS and the PIS. The at least one camera 1118 may be a shared component by the QAS, the CDS and the PIS but embedded in the PM system 1110, by way of non-limiting example. In some embodiments, the at least one camera may be part of the PIS but embedded in the PM system 1110 to capture the image of the product immediately or shortly after the code is printed on the substrate.

For example, every picture may be sent to the counterfeit detection system. The captured images (i.e., photographs or picture) may be stored in the counterfeit product image database 1145. Depending on the production, images of the product may be stored in the counterfeit product image database 1145. Images of the packaging (PK) may be stored in the counterfeit package image database 1146.

In some embodiments, every X captured image may be sent to the print inspection system 1160 (i.e., inspection system 160). Depending on the production, images of the product may be stored in the product image archive database 1175. Images of the packaging (PK) may be stored in package image archive database 1176.

In some embodiments, the QAS may also receive captured images which are stored in the QA product image database 1135. Depending on the production, the images of the packaging may be stored in the QA package image database 1136. The PM system 1110 (i.e., PM system 110) may be used the cameras in the production line (i.e., production line 140) to capture images for at least one of the product and package for quality control operations, counterfeit detection and printed content inspection.

Figure 12A:
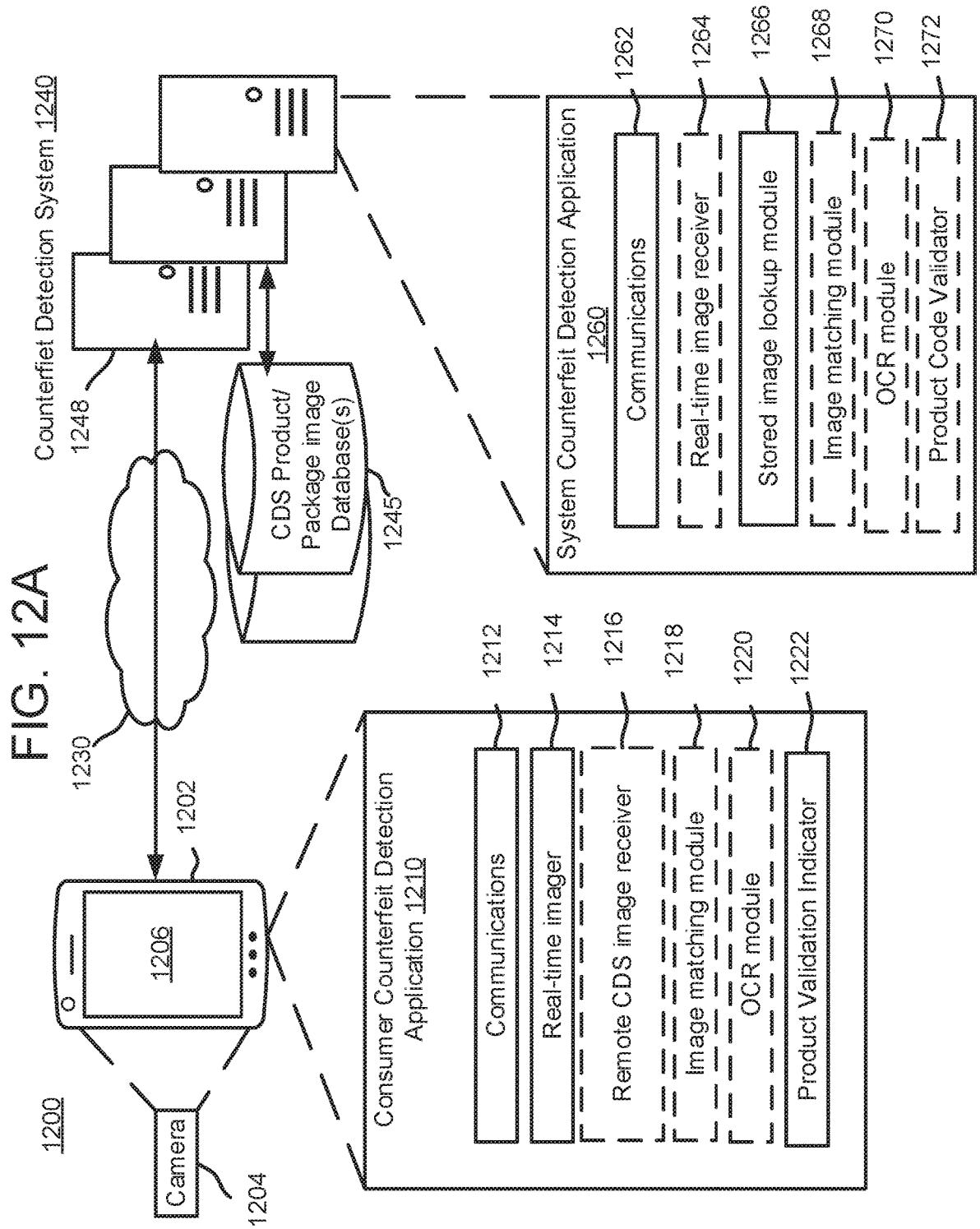
FIG. 12A illustrates a block diagram of a counterfeit detection system.

FIG. 12A illustrates a block diagram of a system 1200 having a mobile computing device 1202 configure to have selective communications with a counterfeit detection system (CDS) 1240. The user may initiate a communication session with the CDS 1240 via the mobile computing device 1202. The mobile computing device 1202 may include a computing device such as described in relation to FIG. 10. The mobile computing device 1202 may be video-enabled or camera-enabled via a video camera or camera 1204. The mobile computing device 1202 may include various applications including a network interface for communicating wirelessly through the Internet or other wireless communication system 1230. The mobile computing device 1202 may include a consumer counterfeit detection application 1210.

The consumer counterfeit detection application 1210 may include a communication module 1212 to establish communications with the counterfeit detection system 1240 being remote from the mobile computing device 1202. The consumer counterfeit detection application 1210 may include a real-time imager 1214 which interfaces with the video device or camera 1204 to capture an image of the product or package being investigated for authenticity, including a visible code being visible to the unaided eye. The consumer counterfeit detection application 1210 may include a remote CDS image receiver 1216 represented in dashed lines to denote an optional function, as will be discussed in more detail. The consumer counterfeit detection application 1210 may include an image matching module 1218 configured to determine a match between the real-time image captured by the mobile computing device 1202 and a stored image produced by the PM system 110 at the time of production. The image matching module 1218 is represented in dashed lines to denote an optional function, as will be discussed in more detail.

In some embodiments, the consumer counterfeit detection application 1210 may include an optical character recognition (OCR) module 1220, denoted in a dashed line to denote an optional function. In some embodiment, the OCR algorithms of the OCR module 1120 may be trained based on validation of any digit whether passed or failed during the print inspection system. Thus, a suite of trained OCR algorithms for each printer technology may be stored in the mobile computing device 1202 such that the trained OCR algorithms would detect the authentication code based on printer technology. The authentication code instead of the image may be sent to the CDS 1240 for validation matching. The application 1210 may include the image matching module 1218 to match the authentication code or OCR algorithms in the OCR module 1220. The OCR module 1220 would perform OCR detection using the image captured by the real-time imager 1214 interfaced with the camera 1204, by way of non-limiting example.

The consumer counterfeit detection application 1210 may include a product validation indicator 1222 configured to provide the user an indication on the display 1206 of the mobile computing device 1202 regarding the status of the authentication or validation. The indication may be a visual display on display 1206 or an audible notification through the speaker of the mobile computing device 1202.

The remote CDS image receiver 1216 and the image match module 1218 may be optional as these functions may be performed by the CDS 1240 sending an indication of authenticity (pass) or failure to verify, for example. The indication or result may be display on display 1206.

The counterfeit detection system (CDS) 1240 may include one or more servers 1248 coupled to the CDS product and package image databases 1245. The counterfeit detection system (CDS) 1240 may include a system counterfeit detection application 1260.

The system counterfeit detection application 1260 may include a communications module 1262 to communicate through the Internet or communication network 1230 to a consumer associated with the mobile computing device 1202. The system counterfeit detection application 1260 may receive via a real-time image receiver 1264, a real-time image from the mobile computing device 1202 captured by the camera 1204 or video device. The system counterfeit detection application 1260 may lookup the stored product/package image using the stored image lookup module 1266.

The system counterfeit detection application 1260 may include an image matching module 1268 configured to determine a match between the real-time image received from the mobile computing device 1202 and a stored image retrieved, via a lookup module 1266, from databases 1245. The image matching module 1268 is represented in dashed lines to denote an optional function, as this function may be performed by the mobile computing device 1202. The system counterfeit detection application 1260 may include a product or code validator 1272 configured to communicate to the mobile computing device 1202 an indication for display representative of an indication of authenticity (pass) or failure to authenticate product/package. The indication may be a visual display on display 1206 or an audible notification through the speaker of the mobile computing device 1202.

Figure 12B:
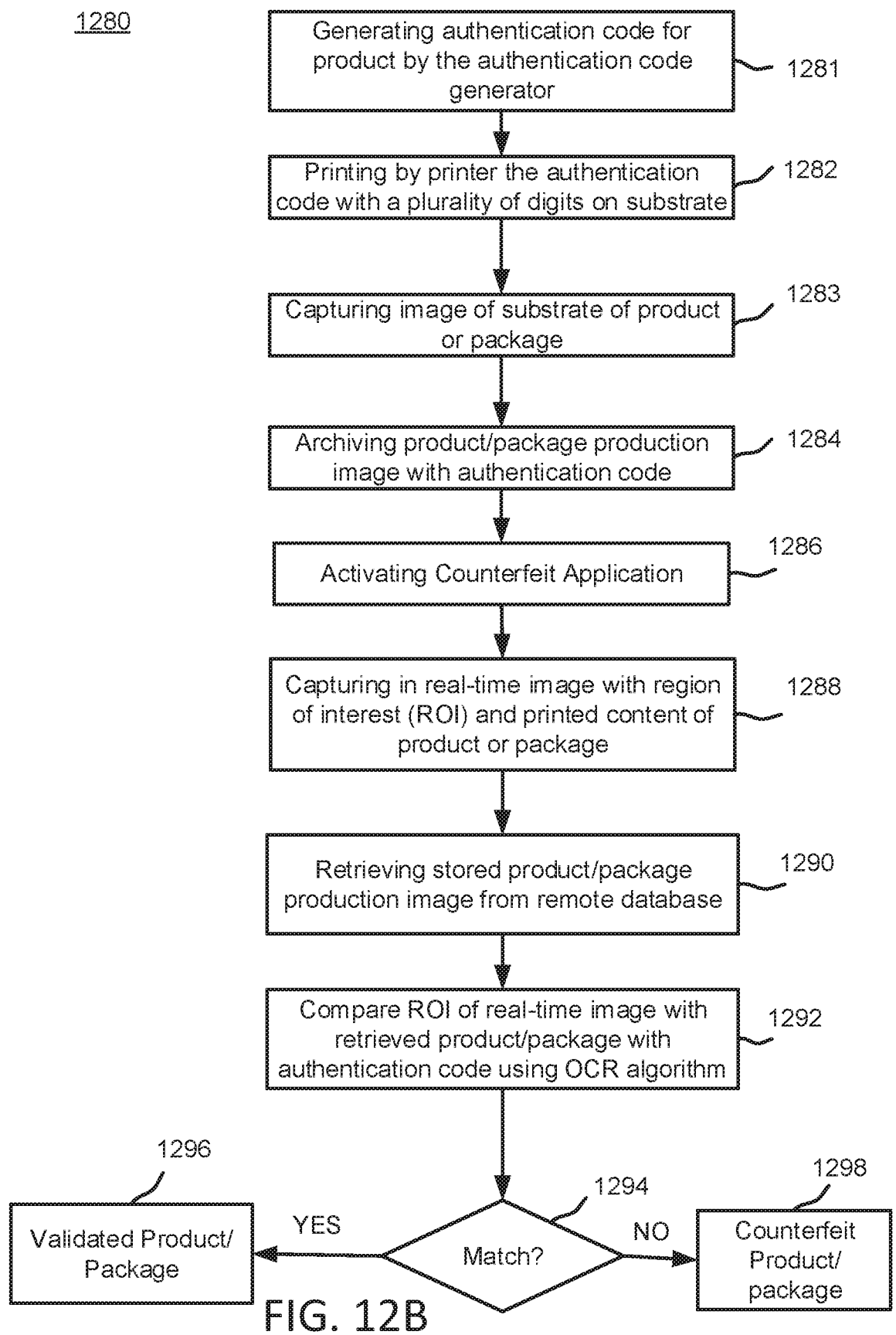
FIG. 12B illustrates flowchart of a counterfeit detection process.

FIG. 12B illustrates flowchart of a counterfeit detection process 1280. The process 1280 may include, at block 1281, for generating an authentication code for a product or package by the authentication code generator 1072. As sometimes used herein the term "product" may sometimes refer to a "package" or both a product packaged together with a package. At block 1282, the process 1280 may include printing by a printer printed content on a substrate including a plurality of digits. At block 1283, the process 1280 may include capturing an image of the substrate on a package or product. At block 1284, archiving the image during production of the product in a database. At block 1286, the process 1280 may include activating counterfeit application 1286. At block 1288, the process 1280 may include capturing in real-time an image with region of interest (ROI) and all digits of the printed content of the product or package. At block 1290, the process 1280 may include retrieving a stored image of the product or package from the CDS database. At block 1292, the process 1280 may include comparing a region of interest (ROI) in the two images. At block 1294, the process 1280 may determine if there is a match between the two images. If there is a match, an indicator is generated that the product or package is validated or authenticated. If there is not a match, an indicator is generated representative of the failure or that the product or package is counterfeit.

In counterfeit detection process, the same images used in the production line are used in the CDS 1140 or 1240 and the PIS 160 or 1160 to determine a code match based on image recognition.

In some embodiment, the OCR algorithms may be trained based on validation of any digit whether passed or failed during the print inspection system. Thus, a suite of trained OCR algorithms for each printer technology may be stored in the mobile computing device or remotely such that the trained OCR algorithms when executed would detect the authentication code based on printer technology in the real-time image. The authentication code instead of the image would be sent to the CDS 1140 or 1240 for validation matching.

Alternately, the CDS 1140 or 1240 may include the trained OCR algorithms. The trained OCR algorithm at the CDS 1140 or 1240 may perform optical character recognition on the image from the mobile computing device to detect the authentication code embedded within. Hence, the CDS 1140 or 1240 would generate a communication back to the mobile computing device to indicate the authenticity of the product or package.

Referring now to FIG. 10, in a basic configuration, the computing device 1050 may include any type of stationary computing device or a mobile computing device. The computing device 1050 may be a computing system with one or more servers, each server including one or more processors. The servers may include a server application running on the server for online communications and may provide graphical user interface (GUI) or webpages. The term computing device and computing system may be interchangeable. The processors 161 and 180 may be computing devices, web servers or other computer devices. In some embodiments, the processor 161 and 180 may be connected to the computing device 150 via the Internet, Intranet, local area network (LAN), or wide area network (WAN). Communications between computing device 150 and the processors 161 and 180 may be wired, wireless or a combination of wired and wireless.

Computing device 1050 may include one or more processors 1052 and system memory in hard drive 1054. Depending on the exact configuration and type of computing device, system memory may be volatile (such as RAM 756), non-volatile (such as read only memory (ROM 1058), flash memory 1060, and the like) or some combination of the two. System memory may store operating system 1064, one or more applications, and may include program data for performing at least the processes 800, 858 and 1280, described herein. Computing device 1050 may also have additional features or functionality. For example, computing device 1050 may also include additional data storage devices (removable and/or non-removable) such as, for example, magnetic disks, optical disks, or tape. Computer storage media may include volatile and non-volatile, non-transitory, removable and non-removable media implemented in any method or technology for storage of data, such as computer readable instructions, data structures, program modules or other data. System memory, removable storage and non-removable storage are all examples of computer storage media. Computer storage media includes, but is not limited to, RAM, ROM, Electrically Erasable Read-Only Memory (EEPROM), flash memory or other memory technology, compact-disc-read-only memory (CD-ROM), digital versatile disks (DVD) or other optical storage, magnetic cassettes, magnetic tape, magnetic disk storage or other magnetic storage devices, or any other physical medium which can be used to store the desired data and which can be accessed by computing device. Any such computer storage media may be part of device.

Computing device 1050 may also include or have interfaces for input device(s) (not shown) such as a keyboard, mouse, pen, voice input device, touch input device, etc. The computing device 1050 may include or have interfaces for connection to output device(s) such as a display 1062, speakers, etc. The computing device 1050 may include a peripheral bus 1066 for connecting to peripherals. Computing device 1050 may contain communication connection(s) that allow the device to communicate with other computing devices, such as over a network or a wireless network. By way of example, and not limitation, communication connection(s) may include wired media such as a wired network or direct-wired connection, and wireless media such as acoustic, radio frequency (RF), infrared and other wireless media. The computing device 1050 may include a network interface card 1068 to connect (wired or wireless) to a network.

The computing device 1050 may include applications stored in the hard drive 1054 for carrying out various processes and functions described herein. The hard drive may include a product/package code generator 1070 with a plurality of digits using standard characters, numbers or symbols in any language according to various printer technologies to produce a "standard code" for a product or package. A digit includes a character, number, or symbol. A digit may include all or part of a logo.

In some embodiments, the product/package code or "standard code" from the code generator 1070 may be converted to an authentication code to prevent or deter counterfeit production of the products and/or packages. All codes including "standard codes" are authentication codes when printed. However, some codes can be duplicated and copied on counterfeit products. Thus, in some instances, the authentication code is for the prevention of counterfeiting of products and/or packages.

The applications may include an authentication code generator 1072 to deter counterfeit production of similar products or packages. The authentication code generator 1072 may include a character modifier 1074. The character modifier 1072 may modify any standard digit (i.e., character, number, or symbol) in any language found in the "standard code." The character modifier 1072 may include a font characteristic modifier 1076 and a dot or pixel modifier 1078 to modify a dot or pixel of a digit. The font characteristic modifier 1076 may change the size, shape and spacing of a font for a digit.

The authentication code generator 1072 may include a multiple code line generator 1080 wherein the multiple code line generator 1080 overlays or superimposes two or more lines of digits. In some instances, the multiple code line generator 1080 may generate two or more lines of digits into covert codes which may be used together to verify the authenticity of a product or package.

The authentication code generator 1072 may include a figure, symbol or logo generator 1082 which is generated randomly or based on a stored set of figures, symbols and/or logos. The authentication code generator 1072 may receive the "standard code" from code generator 1070 and modify the "standard code" to generate an authentication code based on one or more of the character modifier 1074, the figure, symbol or logo generator 1082 and the multiple code line generator 1080.

One of the "standard code" or the authentication code may be stored in the field values 132 for printing by the printer as the printed content on a substrate.

Computer program code for carrying out operations described above may be written in a variety of programming languages, including but not limited to a high-level programming language, such as Java, C or C++, for development convenience. In addition, computer program code for carrying out operations of embodiments described herein may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed Digital Signal Processor (DSP) or microcontroller. A code in which a program of the embodiments is described can be included as a firmware in a RAM, a ROM and a flash memory. Otherwise, the code can be stored in a tangible computer-readable storage medium such as a magnetic tape, a flexible disc, a hard disc, a compact disc, a photo-magnetic disc, a digital versatile disc (DVD) or other tangible and non-transitory memory device.

The embodiments may be configured for use in a computer or a data processing apparatus which includes memory devices, such as a central processing unit (CPU), a RAM and a ROM as well as a storage medium such as a hard disc.

Figure 13A:
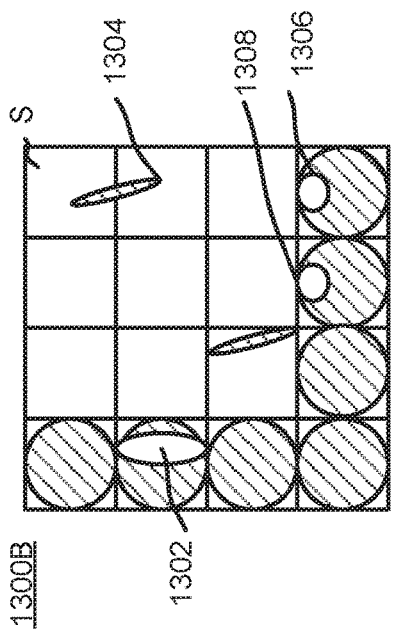
FIG. 13A illustrates an ideal character template.

FIG. 13A illustrates an ideal printed character template 1300A. The ideal printed character template 1300A includes for example a matrix X by Y where in the example, X is 4 and Y is 4. However, other values of X and Y may be used such as 8, 9, 10, etc. The values of X and Y may differ. The template 1300A represents a matrix used to form an ideal character printed by for example using inkjet technology.

Each standard character, number or symbol (i.e., digit) is generated using an ideal character template wherein the character, number or symbol size and shape are printed to conform to the size of the matrix such that adjacent symbols, characters or numbers have similar size and shape set to the same font, for example. The printer may include a printer controller (not shown) to generate each standard digit and a logo, for example, according to industry standards and practices. For example, in inkjet technology, drop charge values for generating a standard digit is pre-programmed in the printer controller.

By way of example, the template 1300A includes the character "L" in which includes ink is filled in cells of the matrix in a vertical line on the left side of the template and cells in a horizontal line at a bottom of the template 1300A. The ink filled matrix cell is shown hatched by vertical lines.

Figure 13B:
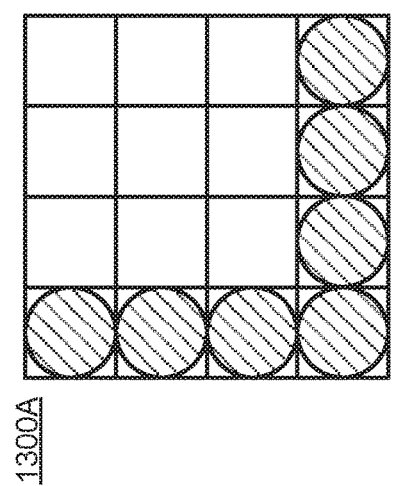
FIG. 13B illustrates a printed character template.

FIG. 13B illustrates a printed character template 1300B. The template 1300B is represented as the same as template 1300A however, the printed character "L" is shown with some of the cells of the filled/printed matrix include un-inked areas 1302 and/or stray ink marks 1304 in the other cells. This un-inked area 1302 and/or stray marks 1304 can cause a failure by the optical character recognition (OCR) algorithm to recognize the digit (i.e., character, number or symbol).

By way of non-limiting example, the stray marks 1304 may be generated as a result of normal operation of a printer, such as those using a viscous ink medium. The un-inked areas 1306 and 1308 may be the result of a modified character such that a dot or pixel was omitted from the digit as required by an authentication code.

However, in an image, the un-inked areas 1306 and 1308 may be an appearance of an un-inked area created by a reflection from the substrate S at the time of image capture by the camera in the PM system 110. For example, the point of reflection may appear along the same plane of a digit such as based on the ambient lighting conditions in which the camera is operated.

The trained OCR algorithms may be varied for substrate reflectivity and/or modified characters or digits, accordingly.

Figure 14B:
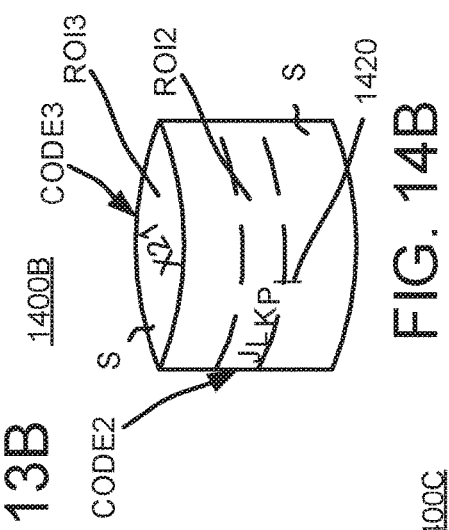
FIG. 14B illustrates a convex substrate in the form of a bottle cap with printed content.
Figure 14C:
FIG. 14C illustrates a concave substrate with printed content partially shown.
Figure 14A:
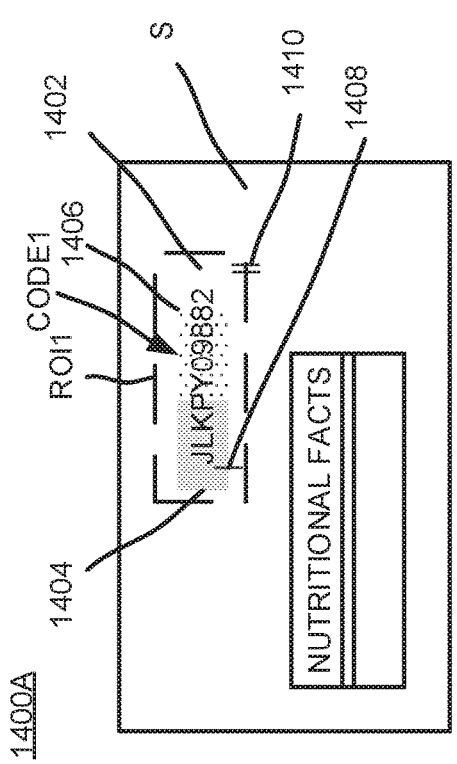
FIG. 14A illustrates a package with printed content in a region of interest (ROI)

FIG. 14A illustrates a package 1400A with printed content in a region of interest ROI1. The printed content includes a plurality of digits "JLKPY09882" in a region of interest ROI1 on substrate S of a product or package. The code of the plurality of digits is surrounded by noise represented by dotted area 1406 in the ROI1, and an adjacent text fields titles "NUTRITIONAL FACTS." The ROI1 may also include a shaded area 1404. The stray line 1408 and lines 1410 represents extraneous matter which may provide noise in the image. The stray line 1408 and lines 1410 are shown to represent extraneous matter which may encroach into the ROI1 area which may cause a false failure by the OCR algorithms.

FIG. 14B illustrates a convex substrate S in the form of a bottle cap 1400B with printed content "JLKP" denoted as CODE2 in a region of interest ROI2 along a vertical plane of the product. The printed content, denoted as CODE 2, being printed on a substrate having a convex shape. Thus, the print when printed has a perspective view. The top substrate of the bottle cap 1400B may include a code, denoted as CODE3, on a top flat surface in region of interest ROI3 of the bottle cap. This surfaces of the bottle cap 1400B may be plastic. In some embodiments, the surfaces may be metal and have a reflectivity. The line 1420 represents a stray line which may be captured in an image which may encroach into the region of interest ROI2.

FIG. 14C illustrates a concave substrate 1450 with printed content, denoted as CODE4, partially shown in a region of interest, denoted as ROI4. In some packaging, such as metal aerosol spray cans, the bottom of the can may include a concaved surface on which is printed a code or printed content is applied thereon.

Figure 15A:
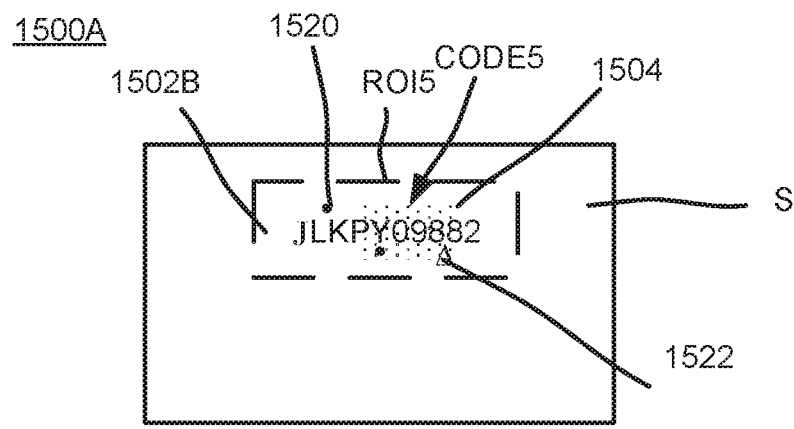
FIGS. 15A and 15B illustrate counterfeit codes.

FIG. 15A illustrates an authentication code 1500A including a plurality of characters, such as by example, "JLKPY09882" as CODE 5 in a region of interest ROI5 on substrate S of a product or package. The region of interest ROI5 is denoted by the dashed lined box. The area 1502B of the region of interest ROI5 may include a solid color such as white or other colors. The area 1502B of the region of interest ROI5 includes noise denoted by the dotted pattern 1504. In some embodiments, the noise may be the result of the product in a transparent or semi-transparent container or substrate.

The authentication code 1500A may include a code with a modified character, such as described is U.S. Pat. No. 8,982,424, to Robert Weaver and assigned to Videojet Technologies, Inc. and incorporated herein by reference as if set forth in full herein. The authentication code may include two covert codes to verify the authenticity of the product or package. In some codes, at least one dot or pixel used to create a character, number or symbol, in any language, may be removed to create a single modified character, number or symbol (i.e., digit).

The authentication code 1500A may include at least one character, number or symbol which is randomly modified to change a characteristic of one or more characters, number or symbols. By way of non-limiting example, a characteristic may include a font type, font size and font spacing. The original product code or other code may include a first font wherein the modified characters, numbers or symbols may be modified to include at least one of a different font size and a different font type. In the example, the first character "J" has a characteristic of the modified font.

The authentication code 1500A may include an arbitrary figure, arbitrary symbol 1520 and 1522 or an arbitrary logo incorporated in the authentication code. While the example authentication code includes one or more modified characters or additional figures, symbols or logo, the authentication code 1500A may include other variations including randomly generated variations to distinguish the authentication code 1500A.

The authentication code 1500A is visible to the unaided eye or does not require special glasses to see the digits of the code on the substrate.

Figure 15B:
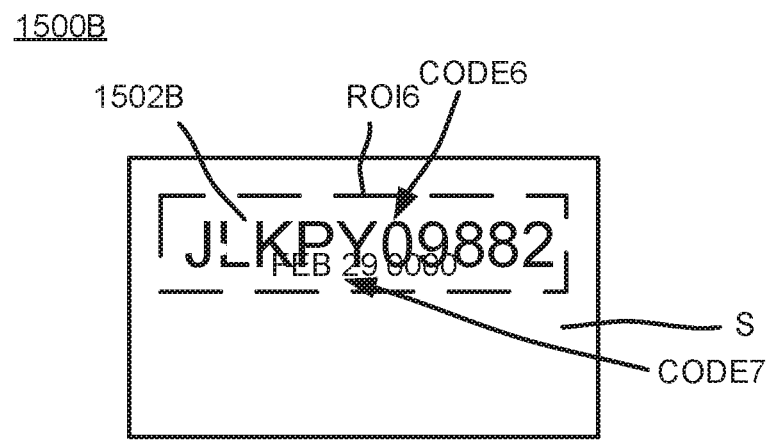

FIG. 15B illustrates an authentication code 1500B including a plurality of characters, such as by example, "JLKPY09882" represents code CODE6 in a region of interest ROI6 on substrate S of a product or package. The region of interest ROI6 is denoted by the dashed lined box. The area 1502B of the region of interest ROI6 may include a solid color such as white or other colors. In this code 1500B, two lines of code CODE6 and CODE7 wherein the code digits "FEB 29 0000" denoted as CODE7 are superimposed or overlaid at least in part on a portion of the code digits "JLKPY09882" denoted as CODE6. In some codes, only a portion of the digits of code CODE6 would by overlaid on a portion of the digits of code CODE7. In this example, the "L" has a missing dot or pixel. The OCR algorithm may be trained for reflective surfaces to detect to edges of a character or digit with a "reflective" edge wherein a "reflective" edge appearing white or silver in a captured image under various ambient lighting conditions. Similarly, if the code is an authentication code, non-inked portions embedded within the modified digit may be detected using the field values.

In some embodiments digits may be adjusted in space relative to an adjacent digit.

The provided examples are for illustrative purposes of authentication code variations. As can be appreciated, describing all possible variations is prohibitive.

The "step-by-step process" for performing the claimed functions herein is a specific algorithm, and may be shown as a mathematical formula, in the text of the specification as prose, and/or in a flow chart. The instructions of the software program create a special purpose machine for carrying out the particular algorithm. Thus, in any means-plus-function claim herein in which the disclosed structure is a computer, or microprocessor, programmed to carry out an algorithm, the disclosed structure is not the general purpose computer, but rather the special purpose computer programmed to perform the disclosed algorithm.

A general purpose computer, or microprocessor, may be programmed to carry out the algorithm/steps for creating a new machine. The general purpose computer becomes a special purpose computer once it is programmed to perform particular functions pursuant to instructions from program software of the embodiments described herein. The instructions of the software program that carry out the algorithm/steps electrically change the general purpose computer by creating electrical paths within the device. These electrical paths create a special purpose machine for carrying out the particular algorithm/steps.

Unless otherwise defined, all terms (including technical and scientific terms) used herein have the same meaning as commonly understood by one of ordinary skill in the art to which embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In particular, unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such data storage, transmission or display devices.

The terminology used herein is to describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order or importance, but rather the terms first, second, etc., are used to distinguish one element from another.

While various disclosed embodiments have been described above, it should be understood that they have been presented by way of example only, and not limitation.

Numerous changes, omissions and/or additions to the subject matter disclosed herein can be made in accordance with the embodiments disclosed herein without departing from the spirit or scope of the embodiments. Also, equivalents may be substituted for elements thereof without departing from the spirit and scope of the embodiments. In addition, while a particular feature may have been disclosed with respect to only one of several implementations, such feature may be combined with one or more other features of the other implementations as may be desired and advantageous for any given or particular application. Furthermore, many modifications may be made to adapt a particular situation or material to the teachings of the embodiments without departing from the scope thereof.

Therefore, the breadth and scope of the subject matter provided herein should not be limited by any of the above explicitly described embodiments. Rather, the scope of the embodiments should be defined in accordance with the following claims and their equivalents.

What is claimed is:

1. A device comprising:
a printer configured to apply a code of printed content on a substrate of a product based on a printer technology type, the code having a plurality of digits; and
optical code detector, executed by one or more processors, to detect the code in a received image of the product printed by the printer by optically recognizing characters in the received image using a trained optical character recognition (OCR) algorithm for the printer technology type, the OCR algorithm trained to identify each digit of the plurality of digits of the code in a region of interest (ROI) based on at least one parameter of the product to which the printed content is directly applied and the printer technology type.

2. The device of claim 1, wherein the printer technology type includes one of continuous inkjet (CIJ) printer, laser printer, thermal transfer overprinting (TTO) printer, and thermal inkjet (TIJ) printer.

3. The device of claim 1, wherein the code is an authentication code including at least one of a standard character, standard number and standard symbol in any language and at least one of a modified character, modified number and a modified symbol wherein the OCR algorithm being trained to recognize the at least one of the standard character, the standard number and the standard symbol and the at least one of the modified character, the modified number and the modified symbol.

4. The device of claim 1, wherein the trained OCR algorithm being trained based on validation of failed digits of the detected code.

5. The device of claim 1, wherein the trained OCR algorithm being trained based on the at least one parameter of the product includes one or more of reflectivity of the substrate, material of the substrate, color of the substrate, concavity of the substrate, convexity of the substrate, and transparency of the substrate.

6. A system, comprising:
a printer configured to apply a code of printed content on a substrate of a product based on a printer technology type, the code having a plurality of digits;
a camera to capture automatically an image of the code on the substrate of the product; and
optical code detector, executed by one or more processors, to detect the code in the captured image of the product printed by the printer by optically recognizing characters in the captured image using a trained optical character recognition (OCR) algorithm for the printer technology type, the OCR algorithm trained to identify each digit of the plurality of digits of the code in a region of interest (ROI) based on at least one parameter of the product to which the printed content is directly applied and the printer technology type.

7. The system of claim 6, wherein the printer is one printer of a plurality of printers in a printer marking (PM) system, and further comprising:
at least one memory device to store a plurality of image recognition (IR) algorithms and a plurality of optical character recognition (OCR) algorithms for a plurality of printer technology types, each OCR algorithm associated with a respective one printer technology type; and
a print inspection system (PIS) having the one or more processors wherein the one or more processors include an inspection processor having a classification engine in communication with the PM system and includes the optical code detector, the inspection processor:
receives metadata and field values regarding the product printed with the code by the PM system;
selects an image recognition (IR) algorithm from the plurality of IR algorithms based on the metadata;
recognizes the product in the image based on the IR algorithm to generate an IR result and to identify the region of interest;
selects an OCR algorithm from the plurality of OCR algorithms based on a printer technology type in the metadata;
initiates the optical code detector to perform the optical character recognition (OCR) using the selected OCR algorithm to recognize the plurality of digits in the region of interest of the image based on the metadata to generate an OCR result;
decodes the OCR result and the IR result, and
generates a communication to the PM system of the decoded results indicating pass or fail of the printed content to control at least one action of the PM system.

8. The system of claim 6, further comprising a database of archived images, the archived images being the captured images.

9. The system of claim 6, further comprising a second inspection processor having a graphical user interface (GUI) task generator which generates a task to inspect an inspection image, the GUI includes the inspection image and a data field to enter an inspected criteria result.

10. The system of claim 6, wherein when the inspection processor decodes, the inspection processor determines whether the recognized product matches the metadata, and if the product does not match the metadata, the communication to the PM system of the decoded result indicating failure of the product is generated.

11. The system of claim 6, wherein the printer technology type includes one of continuous inkjet (CIJ) printer, laser printer, thermal transfer overprinting (TTO) printer, and thermal inkjet (TIJ) printer.

12. The system of claim 6, wherein the code is an authentication code including at least one of a standard character, standard number and standard symbol in any language and at least one of a modified character, modified number and a modified symbol wherein the OCR algorithm being trained to recognize the at least one of the standard character, the standard number and the standard symbol and the at least one of the modified character, the modified number and the modified symbol.

13. The system of claim 6, wherein the trained OCR algorithm being trained based on validation of failed digits of the detected code.

14. The system of claim 6, wherein the trained OCR algorithm being trained based on the at least one parameter of the product includes one or more of reflectivity of the substrate, material of the substrate, color of the substrate, concavity of the substrate, convexity of the substrate, and transparency of the substrate.

15. A method, comprising:
    printing, by a printer, a code of printed content on a substrate of a product based on a printer technology type, the code having a plurality of digits;
    automatically capturing, by a camera, an image of the code on the substrate of the product; and
    optically detecting, by one or more processors, the code in the captured image of the product printed by the printer, the detecting includes optically recognizing characters in the captured image using a trained optical character recognition (OCR) algorithm for the printer technology type, the OCR algorithm trained to identify each digit of the plurality of digits of the code in a region of interest (ROI) based on at least one parameter of the product to which the printed content is directly applied and the printer technology type.

16. The method of claim 15, wherein the printer is one printer of a plurality of printers in a printer marking (PM) system, and further comprising:
    storing, in at least one memory device, a plurality of image recognition algorithms and a plurality of optical character recognition (OCR) algorithms for a plurality of printer technology types, each OCR algorithm associated with a respective one printer technology type; and
    performing a print inspection in a print inspection system (PIS) having the one or more processors wherein the one or more processors include an inspection processor having a classification engine in communication with the PM system, wherein the performing of the print inspection includes:
        receiving metadata and field values regarding the product printed with the code by the PM system;
        selecting an image recognition (IR) algorithm from the plurality of IR algorithms based on the metadata;
        recognizing the product in the image based on the IR algorithm to generate an IR result and to identify the region of interest;
        selecting an OCR algorithm from the plurality of OCR algorithms based on a printer technology type in the metadata;
        performing the optical detecting using the selected OCR algorithm to recognize the plurality of digits in the region of interest of the image based on the metadata to generate an OCR result;
        decoding the OCR result and the IR result, and
        generating a communication to the PM system of the decoded result indicating pass or fail of the printed content.

17. The method of claim 15, further comprising archiving in a database by the PIS the images.

18. The method of claim 15, wherein the PIS further comprising a second inspection processor having a graphical user interface (GUI) task generator; and further comprising:
    generating a task to inspect an inspection image, the GUI includes the inspection image and a data field to enter an inspected criteria result based on the inspection image.

19. The method of claim 15, wherein the decoding includes: determining whether the recognized product matches the metadata, and if the product does not match the metadata, the communication to the PM system of the decoded result indicating failure of the product is generated.

20. The method of claim 15, wherein the code is an authentication code including at least one of a standard character, standard number and standard symbol in any language and at least one of a modified character, modified number and a modified symbol wherein the OCR algorithm being trained to recognize the at least one of the standard character, the standard number and the standard symbol and the at least one of the modified character, the modified number and the modified symbol.

\* \* \* \* \*